US007289612B2

(12) United States Patent
Lurie et al.

(10) Patent No.: US 7,289,612 B2
(45) Date of Patent: Oct. 30, 2007

(54) APPARATUS AND METHOD FOR ENSURING A REAL-TIME CONNECTION BETWEEN USERS AND SELECTED SERVICE PROVIDER USING VOICE MAIL

(75) Inventors: Steven Lurie, San Francisco, CA (US); Scott Faber, San Francisco, CA (US); Sean Van der Linden, San Francisco, CA (US)

(73) Assignee: UTBK, Inc., Dover, DE (US)

( * ) Notice: Subject to any disclaimer, the term of this patent is extended or adjusted under 35 U.S.C. 154(b) by 634 days.

(21) Appl. No.: 10/611,050

(22) Filed: Jul. 1, 2003

(65) Prior Publication Data
US 2006/0215826 A1   Sep. 28, 2006

Related U.S. Application Data

(63) Continuation of application No. 09/947,591, filed on Sep. 5, 2001, now Pat. No. 6,704,403.

(51) Int. Cl.
*H04M 15/00* (2006.01)
*H04M 3/42* (2006.01)

(52) U.S. Cl. .............................. 379/114.1; 379/114.01; 379/114.21; 379/210.01

(58) Field of Classification Search ........... 379/114.01, 379/114.03, 114.05, 114.1, 114.13, 114.21, 379/114.23, 114.24–114.28, 67.1, 88.06, 379/88.12, 88.17, 88.18, 90.01, 201.01, 209.01, 379/210.01, 214.01, 218.01, 265.01, 265.06, 379/265.09, 265.12; 705/5, 37, 52, 53; 707/6, 707/10

See application file for complete search history.

(56) References Cited

U.S. PATENT DOCUMENTS 4,313,035 A   1/1982   Jordan et al.

(Continued)

FOREIGN PATENT DOCUMENTS

AU   699785   5/1995

(Continued)

OTHER PUBLICATIONS

U.S. Appl. No. 09/596,466, filed Jun. 19, 2000, Hector A. Agdeppa.

(Continued)

*Primary Examiner*—Quoc Tran
(74) *Attorney, Agent, or Firm*—John P. Ward; Greenberg Traurig LLP

(57) ABSTRACT

A method and apparatus are described for ensuring a real-time connection between users and selected service providers using voice mail. The system enables seekers of a wide array of services to select, contact, converse, and pay for a service provider using a communications device such as the telephone. A seeker locates a service provider by providing the name of a profession, which is recognized by the system's software. Once a service provider is selected, the system connects the seeker with the service provider for a live conversation. However, during service provider unavailability, the system enables the seeker to leave a voice mail message for the service provider and reconnects the user and service provider once the message is reviewed by the service provider. The system automatically bills the seeker for the time spent conversing with the service provider and compensates the service provider.

39 Claims, 14 Drawing Sheets

U.S. PATENT DOCUMENTS

| | | | |
|---|---|---|---|
| 4,577,065 A | 3/1986 | Frey et al. | |
| 4,631,428 A | 12/1986 | Grimes | |
| 4,645,873 A | 2/1987 | Chomet | |
| 4,677,434 A | 6/1987 | Fascenda | |
| 4,723,283 A | 2/1988 | Nagasawa et al. | |
| 4,751,669 A | 6/1988 | Sturgis et al. | |
| 4,752,675 A | 6/1988 | Zetmeir | |
| 4,847,890 A | 7/1989 | Solomon et al. | |
| 4,878,239 A | 10/1989 | Solomon et al. | |
| 4,969,185 A | 11/1990 | Dorst et al. | |
| 5,017,917 A | 5/1991 | Fisher et al. | |
| 5,058,152 A | 10/1991 | Solomon et al. | |
| 5,148,474 A | 9/1992 | Haralambopoulos et al. | |
| 5,155,743 A | 10/1992 | Jacobs | |
| 5,155,761 A * | 10/1992 | Hammond | 379/88.2 |
| 5,206,903 A | 4/1993 | Kohler et al. | |
| 5,319,542 A | 6/1994 | King, Jr. et al. | |
| 5,325,424 A | 6/1994 | Grube | |
| 5,347,632 A | 9/1994 | Filepp et al. | |
| 5,359,508 A | 10/1994 | Rossides | |
| 5,361,295 A | 11/1994 | Solomon et al. | |
| 5,369,694 A | 11/1994 | Bales et al. | |
| 5,448,625 A | 9/1995 | Lederman | |
| 5,453,352 A | 9/1995 | Tachibana | |
| 5,459,779 A | 10/1995 | Backaus et al. | |
| 5,469,497 A | 11/1995 | Pierce et al. | |
| 5,497,502 A | 3/1996 | Castille | |
| 5,524,146 A | 6/1996 | Morrisey et al. | |
| 5,537,314 A | 7/1996 | Kanter | |
| 5,539,735 A | 7/1996 | Moskowitz | |
| 5,555,298 A | 9/1996 | Jonsson | |
| 5,557,677 A | 9/1996 | Prytz | |
| 5,574,780 A | 11/1996 | Andruska et al. | |
| 5,574,781 A | 11/1996 | Blaze | |
| 5,589,892 A | 12/1996 | Knee et al. | |
| 5,590,197 A | 12/1996 | Chen et al. | |
| 5,596,634 A | 1/1997 | Fernandez et al. | |
| 5,602,905 A | 2/1997 | Mettke | |
| 5,604,803 A | 2/1997 | Aziz | |
| 5,608,786 A | 3/1997 | Gordon | |
| 5,615,213 A | 3/1997 | Griefer | |
| 5,619,148 A | 4/1997 | Guo | |
| 5,619,570 A | 4/1997 | Tsutsui | |
| 5,619,725 A | 4/1997 | Gordon | |
| 5,619,991 A | 4/1997 | Sloane | |
| 5,623,536 A | 4/1997 | Solomon et al. | |
| 5,634,012 A | 5/1997 | Stefik et al. | |
| 5,638,432 A | 6/1997 | Wille et al. | |
| 5,651,058 A | 7/1997 | Hackett-Jones et al. | |
| 5,668,953 A | 9/1997 | Sloo | |
| 5,675,734 A | 10/1997 | Hair | |
| 5,694,163 A | 12/1997 | Harrison | |
| 5,694,537 A | 12/1997 | Montenegro et al. | |
| 5,694,549 A | 12/1997 | Carlin et al. | |
| 5,701,419 A | 12/1997 | McConnell | |
| 5,710,887 A | 1/1998 | Chelliah et al. | |
| 5,712,979 A | 1/1998 | Graber et al. | |
| 5,715,314 A | 2/1998 | Payne et al. | |
| 5,717,860 A | 2/1998 | Graber et al. | |
| 5,718,247 A | 2/1998 | Frankel | |
| 5,721,763 A | 2/1998 | Joseph et al. | |
| 5,722,418 A | 3/1998 | Bro | |
| 5,724,424 A | 3/1998 | Gifford | |
| 5,734,961 A | 3/1998 | Castille | |
| 5,740,231 A | 4/1998 | Cohn et al. | |
| 5,745,681 A | 4/1998 | Levine et al. | |
| 5,768,348 A | 6/1998 | Solomon et al. | |
| 5,768,521 A | 6/1998 | Dedrick | |
| 5,774,534 A | 6/1998 | Mayer | |
| 5,778,367 A | 7/1998 | Wesinger, Jr. et al. | |
| 5,781,894 A | 7/1998 | Patrecca et al. | |
| 5,794,210 A | 8/1998 | Goldhaber et al. | |
| 5,794,221 A | 8/1998 | Egendorf | |
| 5,802,502 A | 9/1998 | Gell et al. | |
| 5,809,119 A | 9/1998 | Tonomura et al. | |
| 5,809,145 A | 9/1998 | Slik et al. | |
| 5,812,769 A | 9/1998 | Graber et al. | |
| 5,818,836 A | 10/1998 | DuVal | |
| 5,819,092 A | 10/1998 | Ferguson et al. | |
| 5,819,267 A | 10/1998 | Uyama | |
| 5,819,271 A | 10/1998 | Mahoney et al. | |
| 5,819,285 A | 10/1998 | Damico et al. | |
| 5,825,869 A | 10/1998 | Brooks et al. | |
| 5,825,876 A | 10/1998 | Peterson, Jr. | |
| 5,832,523 A | 11/1998 | Kanai et al. | |
| 5,835,896 A | 11/1998 | Fisher et al. | |
| 5,842,212 A | 11/1998 | Ballurio et al. | |
| 5,850,433 A | 12/1998 | Rondeau | |
| 5,860,068 A | 1/1999 | Cook | |
| 5,862,223 A | 1/1999 | Walker et al. | |
| 5,864,871 A | 1/1999 | Kitain et al. | |
| 5,870,744 A | 2/1999 | Sprague | |
| 5,878,130 A | 3/1999 | Andrews et al. | |
| 5,884,032 A | 3/1999 | Bateman et al. | |
| 5,884,272 A | 3/1999 | Walker et al. | |
| 5,884,282 A | 3/1999 | Robinson | |
| 5,889,774 A | 3/1999 | Mirashrafi et al. | |
| 5,890,138 A | 3/1999 | Godin et al. | |
| 5,893,077 A | 4/1999 | Griffin | |
| 5,901,214 A | 5/1999 | Shaffer et al. | |
| 5,903,635 A | 5/1999 | Kaplan | |
| 5,903,877 A | 5/1999 | Berkowitz et al. | |
| 5,907,677 A | 5/1999 | Glenn et al. | |
| 5,911,132 A | 6/1999 | Sloane | |
| 5,914,951 A | 6/1999 | Bentley et al. | |
| 5,915,214 A | 6/1999 | Reece et al. | |
| 5,924,082 A | 7/1999 | Silverman et al. | |
| 5,937,390 A | 8/1999 | Hyodo | |
| 5,940,471 A | 8/1999 | Homayoun | |
| 5,940,484 A | 8/1999 | DeFazio et al. | |
| 5,943,422 A | 8/1999 | Van Wie et al. | |
| 5,946,646 A | 8/1999 | Schena et al. | |
| 5,948,054 A | 9/1999 | Nielsen | |
| 5,960,416 A | 9/1999 | Block | |
| 5,974,141 A | 10/1999 | Saito | |
| 5,974,398 A | 10/1999 | Hanson et al. | |
| 5,982,863 A | 11/1999 | Smiley et al. | |
| 5,987,102 A | 11/1999 | Elliott et al. | |
| 5,987,118 A | 11/1999 | Dickerman et al. | |
| 5,987,430 A | 11/1999 | Van Horne et al. | |
| 5,991,394 A | 11/1999 | Dezonno et al. | |
| 5,999,609 A | 12/1999 | Nishimura | |
| 5,999,611 A | 12/1999 | Tatchell et al. | |
| 6,006,197 A | 12/1999 | d-Eon et al. | |
| 6,011,794 A | 1/2000 | Mordowitz et al. | |
| 6,014,439 A | 1/2000 | Walker et al. | |
| 6,014,644 A | 1/2000 | Erickson | |
| 6,016,478 A | 1/2000 | Zhang et al. | |
| 6,026,087 A | 2/2000 | Mirashrafi et al. | |
| 6,026,148 A | 2/2000 | Dworkin et al. | |
| 6,026,400 A | 2/2000 | Suzuki | |
| 6,028,601 A | 2/2000 | Machiraju et al. | |
| 6,029,141 A | 2/2000 | Bezos et al. | |
| 6,035,021 A | 3/2000 | Katz | |
| 6,046,762 A | 4/2000 | Sonesh et al. | |
| 6,055,513 A | 4/2000 | Katz et al. | |
| 6,058,379 A | 5/2000 | Odom et al. | |
| 6,064,978 A | 5/2000 | Gardener et al. | |
| 6,067,561 A | 5/2000 | Dillon | |
| 6,078,866 A | 6/2000 | Buck et al. | |
| 6,130,933 A | 10/2000 | Miloslavsky | |
| 6,131,085 A | 10/2000 | Rossides | |
| 6,144,670 A | 11/2000 | Sponaugle et al. | |
| 6,167,379 A | 12/2000 | Dean et al. | |

| | | | | | |
|---|---|---|---|---|---|
| 6,167,449 | A | 12/2000 | Arnold et al. | 6,731,625 B1 | 5/2004 Eastep et al. |
| 6,173,279 | B1 | 1/2001 | Levin et al. | 6,741,691 B1 | 5/2004 Ritter et al. |
| 6,175,619 | B1 | 1/2001 | DeSimone | 6,757,364 B2 | 6/2004 Newkirk |
| 6,185,194 | B1 | 2/2001 | Musk et al. | 6,771,760 B1 | 8/2004 Vortman et al. |
| 6,185,289 | B1 | 2/2001 | Hetz et al. | 6,775,359 B1 | 8/2004 Ron et al. |
| 6,188,673 | B1 | 2/2001 | Bauer et al. | 6,798,753 B1 | 9/2004 Doganata et al. |
| 6,188,761 | B1 | 2/2001 | Dickerman et al. | 6,801,899 B2 | 10/2004 Lauffer |
| 6,192,050 | B1 | 2/2001 | Stovall | 6,807,532 B1 | 10/2004 Kolls |
| 6,199,096 | B1 | 3/2001 | Mirashrafi et al. | 6,836,225 B2 | 12/2004 Lee et al. |
| 6,212,192 | B1 | 4/2001 | Mirashrafi et al. | 6,865,540 B1 | 3/2005 Faber et al. |
| 6,212,268 | B1 | 4/2001 | Nielsen | 6,898,435 B2 | 5/2005 Milman |
| 6,216,111 | B1 | 4/2001 | Walker et al. | 6,968,174 B1 | 11/2005 Trandal et al. |
| 6,223,165 | B1 | 4/2001 | Lauffer | 7,032,030 B1 | 4/2006 Codignotto |
| 6,230,287 | B1 | 5/2001 | Pinard et al. | 2001/0012357 A1 | 8/2001 Mirashrafi et al. |
| 6,233,566 | B1 | 5/2001 | Levine et al. | 2001/0025274 A1 | 9/2001 Zehr et al. |
| 6,243,684 | B1 | 6/2001 | Stuart et al. | 2001/0026609 A1 | 10/2001 Weinstein et al. |
| 6,246,875 | B1 | 6/2001 | Seazholtz et al. | 2001/0027481 A1 | 10/2001 Whyel |
| 6,248,946 | B1 | 6/2001 | Dwek | 2001/0029482 A1 | 10/2001 Tealdi et al. |
| 6,259,774 | B1 | 7/2001 | Miloslavsky | 2001/0032247 A1 | 10/2001 Kanaya |
| 6,266,651 | B1 | 7/2001 | Wooston | 2001/0036822 A1 | 11/2001 Mead et al. |
| 6,269,336 | B1 | 7/2001 | Ladd et al. | 2001/0037283 A1 | 11/2001 Mullaney |
| 6,269,361 | B1 | 7/2001 | Davis et al. | 2001/0044751 A1 | 11/2001 Pugliese et al. |
| 6,282,515 | B1 | 8/2001 | Speicher | 2001/0048737 A1 | 12/2001 Goldberg et al. |
| 6,292,799 | B1 | 9/2001 | Peek et al. | 2002/0003867 A1 | 1/2002 Rothschild et al. |
| 6,298,056 | B1 | 10/2001 | Pendse | 2002/0010608 A1 | 1/2002 Faber et al. |
| 6,301,342 | B1 | 10/2001 | Ander et al. | 2002/0010616 A1 | 1/2002 Itzhaki |
| 6,304,637 | B1 | 10/2001 | Mirashrafi et al. | 2002/0024948 A1 | 2/2002 Pendse |
| 6,310,941 | B1 | 10/2001 | Crutcher et al. | 2002/0029241 A1 | 3/2002 Yokono et al. |
| 6,311,231 | B1 | 10/2001 | Bateman et al. | 2002/0038233 A1 | 3/2002 Shubov et al. |
| 6,314,402 | B1 | 11/2001 | Monaco et al. | 2002/0038293 A1 | 3/2002 Seiden |
| 6,314,454 | B1 | 11/2001 | Wang et al. | 2002/0042826 A1 | 4/2002 Gaus et al. |
| 6,323,894 | B1 | 11/2001 | Katz | 2002/0059082 A1 | 5/2002 Moczygemba |
| 6,353,663 | B1 | 3/2002 | Stevens et al. | 2002/0065959 A1 | 5/2002 Kim et al. |
| 6,385,583 | B1 | 5/2002 | Ladd et al. | 2002/0071423 A1 | 6/2002 Mirashrafi et al. |
| 6,389,278 | B1 | 5/2002 | Singh | 2002/0071426 A1 | 6/2002 Karamchedu et al. |
| 6,389,402 | B1 | 5/2002 | Wie et al. | 2002/0072974 A1 | 6/2002 Pugliese et al. |
| 6,393,117 | B1 | 5/2002 | Trell | 2002/0073207 A1 | 6/2002 Widger et al. |
| 6,393,412 | B1 | 5/2002 | Deep | 2002/0087565 A1 | 7/2002 Hoekman et al. |
| 6,400,806 | B1 | 6/2002 | Uppaluru | 2002/0091607 A1 | 7/2002 Sloan et al. |
| 6,404,864 | B1 | 6/2002 | Evslin et al. | 2002/0094074 A1 | 7/2002 Lurie |
| 6,404,877 | B1 | 6/2002 | Bolduc et al. | 2002/0095331 A1 | 7/2002 Osmar et al. |
| 6,404,884 | B1 | 6/2002 | Marwell et al. | 2002/0095359 A1 | 7/2002 Mangetsu |
| 6,430,276 | B1 | 8/2002 | Bouvier et al. | 2002/0107697 A1 | 8/2002 Jensen |
| 6,434,527 | B1 | 8/2002 | Horvitz | 2002/0112005 A1 | 8/2002 Namias |
| 6,463,136 | B1 | 10/2002 | Malik | 2002/0116266 A1 | 8/2002 Marshall |
| 6,470,079 | B1 | 10/2002 | Benson | 2002/0120554 A1 | 8/2002 Vega |
| 6,470,317 | B1 | 10/2002 | Ladd et al. | 2002/0128891 A1 | 9/2002 McSherry |
| 6,470,338 | B1 | 10/2002 | Rizzo et al. | 2002/0133402 A1 | 9/2002 Faber et al. |
| 6,477,246 | B1 | 11/2002 | Dolan et al. | 2002/0133570 A1 | 9/2002 Jacob et al. |
| 6,484,148 | B1 | 11/2002 | Boyd | 2002/0133571 A1 | 9/2002 Jacob et al. |
| 6,493,437 | B1 | 12/2002 | Olshansky | 2002/0169836 A1 | 11/2002 Hood et al. |
| 6,493,671 | B1 | 12/2002 | Ladd et al. | 2002/0191762 A1 | 12/2002 Benson |
| 6,493,673 | B1 | 12/2002 | Ladd et al. | 2002/0193094 A1 | 12/2002 Lawless et al. |
| 6,510,417 | B1 | 1/2003 | Woods et al. | 2002/0193135 A1 | 12/2002 Nakano |
| 6,513,013 | B1 | 1/2003 | Stephanou | 2003/0005126 A1 | 1/2003 Schwartz et al. |
| 6,519,570 | B1 | 2/2003 | Faber et al. | 2003/0043981 A1 | 3/2003 Lurie et al. |
| 6,523,010 | B2 | 2/2003 | Lauffer | 2003/0046161 A1 | 3/2003 Kamanger et al. |
| 6,523,101 | B1 | 2/2003 | Nakata | 2003/0061094 A1 | 3/2003 Banerjee et al. |
| 6,529,878 | B2 | 3/2003 | De Rafael et al. | 2003/0112944 A1 | 6/2003 Brown et al. |
| 6,539,359 | B1 | 3/2003 | Ladd et al. | 2003/0115089 A1 | 6/2003 Lure |
| 6,542,732 | B1 | 4/2003 | Khazaka et al. | 2003/0126205 A1 | 7/2003 Lurie |
| 6,546,372 | B2 | 4/2003 | Lauffer | 2003/0220866 A1 | 11/2003 Pisaris-Henderson |
| 6,549,889 | B2 | 4/2003 | Lauffer | 2003/0223565 A1 | 12/2003 Montemer |
| 6,560,576 | B1 | 5/2003 | Cohen et al. | 2003/0225682 A1 | 12/2003 Montemer |
| 6,563,915 | B1 | 5/2003 | Salimando | 2004/0006511 A1 | 1/2004 Montemer |
| 6,606,376 | B1 | 8/2003 | Trell | 2004/0010518 A1 | 1/2004 Montemer |
| 6,609,106 | B1 | 8/2003 | Robertson | 2004/0023644 A1 | 2/2004 Montemer |
| 6,611,501 | B1 | 8/2003 | Owen et al. | 2004/0066927 A1 | 4/2004 Horvath et al. |
| 6,625,595 | B1 | 9/2003 | Anderson et al. | 2004/0083133 A1 | 4/2004 Nicholas et al. |
| 6,636,590 | B1 | 10/2003 | Jacob et al. | 2004/0096110 A1 | 5/2004 Yogeshwar et al. |
| 6,658,389 | B1 | 12/2003 | Alpdemir | 2004/0162757 A1 | 8/2004 Pisaris-Henderson |
| 6,668,286 | B1 | 12/2003 | Bateman et al. | 2004/0204997 A1 | 10/2004 Blaser et al. |
| 6,704,403 | B2 * | 3/2004 | Lurie et al. ............ 379/114.1 | 2004/0234049 A1 | 11/2004 Melideo |

| | | | |
|---|---|---|---|
| 2004/0234064 | A1 | 11/2004 | Melideo |
| 2004/0236441 | A1 | 11/2004 | Melideo |
| 2004/0252820 | A1 | 12/2004 | Faber et al. |
| 2004/0254859 | A1 | 12/2004 | Aslanian, Jr. |
| 2004/0258048 | A1 | 12/2004 | Melideo |
| 2004/0260413 | A1 | 12/2004 | Melideo |
| 2005/0010795 | A1 | 1/2005 | Tagawa et al. |
| 2005/0021744 | A1 | 1/2005 | Haitsuka et al. |
| 2005/0044238 | A1 | 2/2005 | Jacob et al. |
| 2005/0048961 | A1 | 3/2005 | Ribaudo et al. |
| 2005/0065811 | A1 | 3/2005 | Dunham |
| 2005/0071509 | A1 | 3/2005 | Faber et al. |
| 2005/0080878 | A1 | 4/2005 | Cunningham et al. |
| 2005/0086104 | A1 | 4/2005 | McFadden |
| 2005/0119957 | A1 | 6/2005 | Faber et al. |
| 2005/0165666 | A1 | 7/2005 | Wong et al. |
| 2005/0203799 | A1 | 9/2005 | Faber et al. |
| 2005/0209874 | A1 | 9/2005 | Rossini |
| 2005/0216341 | A1 | 9/2005 | Altberg et al. |
| 2005/0216345 | A1 | 9/2005 | Altberg et al. |
| 2005/0220289 | A1 | 10/2005 | Reding |
| 2005/0222908 | A1 | 10/2005 | Altberg et al. |
| 2005/0251445 | A1 | 11/2005 | Wong et al. |
| 2006/0095343 | A1 | 5/2006 | Clark et al. |
| 2006/0184378 | A1 | 8/2006 | Agarwal et al. |

FOREIGN PATENT DOCUMENTS

| | | |
|---|---|---|
| EP | 04253389.3 | 9/2004 |
| GB | 2329046 A | 10/1999 |
| JP | 409233441 A | 9/1997 |
| JP | 409319812 A | 12/1997 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | 0057326 | 9/2000 |
| WO | WO 00/73960 | 12/2000 |
| WO | WO 01/01217 | 1/2001 |
| WO | 0120518 | 3/2001 |
| WO | 0127825 | 4/2001 |
| WO | WO 01/28141 | 4/2001 |
| WO | WO 01/44973 | 6/2001 |
| WO | WO 02/44870 | 6/2002 |
| WO | PCT/US01/51181 | 3/2003 |

OTHER PUBLICATIONS

U.S. Appl. No. 60/198,642, filed Apr. 20, 2000, Rothschild et al.
U.S. Appl. No. 60/471,535, filed May 19, 2003, Metideo.
Big Green Blog: Jan. 2005 Archives, Feb. 21, 2006.
Information about Expertcity.com retrieved from the Internet [URL:http://www.expertcity.com] on Apr. 9, 2000.
Ingenio Press Archives for 2004, www.ingenio.com, Feb. 21, 2006.
"Jambo Launches to Connect People and Businesses From the Internet to the Phone", Agoura Hills, Calif. May 3, 2005.
"Jambo Names Netzero Co-founder Stacy Haitsuka to New Post of Chief Information Officer", Agoura Hills, Calif., Jul. 5, 2005.
"Jambo Receives $5 Million in Financing from Kline Hawkes & Co., Westlake Venture Partners, Others", Agoura Hills, Calif., Oct. 17, 2005.
Keen.com, Inc. v. InfoRocket.com, Inc., Complaint for Patent Infringement, Trade Dress Infringement and Unfair Competition; Demand for Jury Trial filed Aug. 31, 2001, pp. 1-8 plus 17 pgs. of attachments.
Keen.com, Inc. v. InfoRocket.com, Inc., Preliminary Injuction Hearing, pp. 286-289 (Jan. 8, 2002).
Keen.com Feb. 04, 2006.
Keen.com Plans Web Service Allowing Customers to Hold Private Phone Chats. Don Clark, Wall Street Journal, Nov. 8, 1999.
Keen.com raises $60 Million from Prestigious . . . , Business Wire, Jan. 11, 2000.
PCT Search Report for PCT Application No. PCT/US01/48284, filed Oct. 30, 2001 (corresponding to U.S. Appl. No. 09/702,217), mailed May 13, 2002 (7 pgs.).
Sell and buy advice online, The Ottawa Citizen, Nov. 29, 1999.
"UpSnap Selects LookSmart to Sell Premium Listings on FREE 411 Service for Text-Enabled Cell Phones", Nov. 4, 2004.
"Welcome to Jambo—the leader in Pay-per-Call Solutions" (search results) Oct. 17, 2005.
ADS-CLICK, "ADS-click Adds Skype-Based Pay-Per-Call Advertising Capabilities to Its Private-Labeled Solution, which will be Unveiled at ad;tech New York," Market Wire, Oct. 10, 2005.
ISA/US, International Search Report for International Application No. PCT/US05/12061, 3 pages, Nov. 17, 2006.
Jingle Networks, Inc., "1-800-Free411 Provides Two Great Opportunities to Acquire New Customers," available at least by Oct. 20, 2005.
Jingle Networks, Inc., "Introducing 1-800 FREE411: First Nationwide Free Telephone Directory Assistance Service," Sep. 20, 2005.
The Voice of Technology, Credit World, pp. 20-23, Jul. 1994.
Telecommunications Buyers Guide and Directory, Editor & Publisher, pp. 29TC-38TC, Feb. 1994.
Aspect Telecomm: Aspect Integrates the Web into the Call Center, M2 Presswire, Aug. 1996.
Information, Bid and Asked, Forbes, Aug. 20, 1990, 92.
Attachmate Ready to Answer 'Net questions, Network World, Apr. 8, 1996, 37.
US Courts to Launch First Federal 900 Service, Federal Computer Week Sep. 28, 1992, 8.
Company Devoted to Hot-Line Support, Computer Reseller News, Oct. 21, 1991, 48.
For Telesphere's Clients, Dial '1-900 TUF LUCK', Business Week, Sep. 9, 1991, 88.
When Business Plan and real World Clash, Wall Street Journal, Jun. 9, 1999, B1.
Hidden Cost of Tech Support, PC World, May 1995, 143, Non-compliance month, year.
A New Teleconsultation Terminal System Using ISDN, NTT Review, Jul. 1991, 37, year/month.
Caring for Customers: Real-time text chat and telephony provide personalized customer support and turn queries into sales leads, Internet World Media, Sep. 1999.
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
Masahiko Hase, Shuji Kawakubo and Mineo Shoman, "Advanced Videophone System Using Synchronized Viedo Filing Equipment," NTT Review, vol. 3, No. 4 Jul. 1991, pp. 29-36, month/year.
Abhaya Asthana and Paul Krzyzanowski, "A Small Domain Communications System for Personalized Shopping Assistance," Proceedings of ICPWC94, Publication No. 0-7803-1996-6/94, IEEE, 1994, pp. 199-203.
Linda Littleton, "Meet the Shadowy Future," Proceedings ACM SIGUCCS User Services Conference XXII, Ypsilanti, Michigan Oct. 16-19, 1994, pp. 205-210.
L. F. Ludwing and D.F. Dunn, "Laboratory for Emulation and Study of Integrated and Coordinated Media Communication," Conference on Office Information Systems, Mar. 23-25, 1988, Sponsored by ACM SIGOIS and IEEECS TC-OA in cooperation with IFIP W.G. 8,4, pp. 283-291.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987. pp. 236-242.
ISDN Tutorial:Definitions, http://www.ralphb.net/ISDN/defs.html , printed on Apr. 21, 2000.
ISDN Tutorial: Interfaces, http://www.ralphb.net/ISDN/ifaces.html , printed on Apr. 21, 2000.
"USA Global Link Brings Interactively to Internet Shopping", Business Wire., Oct. 1998.
"Lucent Technology and Netscape Team to Deliver Lucent Ecommerce Solutions", Business Wire, Sep. 1998.
"TriNet's, Help Me, I'm Stuck, Internet Voice Button Services Pushes Web Pages to Online Users", Business Wire, Mar. 1998.

Tehrani, Rich, "e-Rip Van Winkle and the 60 second Nap", Call Center Solution, vol. 18, No. 2, pp. 16(3)., Aug. 1999.

"Netcall Internet Call Buttons Enhance E-Commerce Customer Service and Sales", PR Newswire, p. 7431., Aug. 1999.

"Connecting to On-Line Car Shoppers: Auto Sellers Use Netcall Internet Call—Button Technology to Turn Clicks into Interactive Sales", Business Wire, p. 4089., Jul. 1999.

Davey, Tom, "Wheeling and Dealing Online", PC Week, vol. 13, No. 45, pp. 1, 129., Nov. 1996.

Information about Expertcity.com retrieved from the Internet [URL: http://www.expertcity.com] on Nov. 6, 2000.

"Rent-An Expert On the Web", Information Week, p. 75, Sep. 1999.

"Expercity.com Launches Premier Online Marketplace for Expert Services", PR Newswire, Aug. 1999.

Information about keen.com retrieved from the Internet [URL: http://www.keen.com], on Oct. 24, 2000.

Cynthia Hodgson, "Online Expert Databases & Services", Econtent, Dec. 1999. p. 48-53.

Jeff Peline, "Net Firm to Connect Users by phone", CNET News. com, [retrieved from http://news.cnet.com on Oct. 24, 2001.

"Keen.Com Launches First Live Answer Community", Press release retrieved from http://www.keen.com on Oct. 24, 2000.

John Healey, "From A-Z, You Can Sell Advice Online", Mercury News [retrieved from http://wwwO.mercurycenter.com on Oct. 24, 2001.

Joseph Menn, "An Expert? There's Now a Home for You on the Internet", Los Angeles Times [retrieved from http://www.deverpost.com on Oct. 24, 2001.

"Walker Digital Issued Landmark U.S. Patent No. 5,862,223 for Global Internet Marketplace for Experts", Business Wire, Jan. 26, 1999.

Chris Ott, "Making Good on the Information Economy", Denver Business Journal, Dec. 17, 1999, p. 27.

Michael Rogers et al, "Experts abound at New Web Sites", Library Journal, Mar. 1, 2000, pp. 22-24.

"Surfbrains.com: Brains online save time & money", M2 Presswire, Jul. 11, 2000.

Michael Kanellos, "Do You Want To Know The Meaning of Life?", Computer Reseller News, Mar. 3, 1997, pp. 72-74.

"Applying Technology News", Acccounting Technology, Feb./Mar. 1997, p. 14.

Ellen Greenblatt, "Have you ever wondered . . . ", Datamation, Oct. 1997, p. 126.

"Information for sale: Commercial Digital Reference and AskA Services", Virtual Reference Desk, Sep. 20, 1999, at www.vrd.org/AskA/commAskA.html.

* cited by examiner

500

KEEN™.com
Your Live Answer Community ™

You Are Not Available   Notify me of incoming calls   [• Sign Out]

| Home | My Account | Keen Mall | My Listings | Help |

View My Listings | Create a Listing | My Homepage | My Customers | Speaker Tips

Your Listing Category

In which category would you like your new listing to appear?

| | |
|---|---|
| Age Groups (1131) | Health & Fitness (976) |
| Arts & Entertainment (911) | Hobbies & Collectibles (511) |
| Auctions (352) | Home & Garden (387) |
| Autos & Vehicles (276) | Local Interests (319) |
| Business & Personal Finance (1397) | Personal Advice (3928) |
| Career & Education (791) | Pets (430) |
| Computing & Internet (791) | Romance & Social (3374) |
| Cultural & Religion (536) | Shopping (174) |
| Family & Parenting (729) | Sports & Recreation (468) |
| Food & Cooking (357) | Travel (574) |
| Games (325) | Women's Issues (465) |

Suggest a new topic

Home | My Account | Keen Mall | My Listings | Help

KEEN.com
Your Live Answer Community ™

Home ▫ Get Advice ▫ My Keen ▫ Give Advice ▫ Help

All Categories > Health & Therapy > Diet & Nutrition  Give Advice on this Topic

[ Search ] Find a Keen Member  ☐ This category only

Top Rated     New Listings     Recorded Advice     Next >

| Availability | Name | | Title | Rating | Rate* | |
|---|---|---|---|---|---|---|
| Call Now | DocTalk Is In | 📷✓ | Weight Loss & Nutrition Information from DocTalk | 15 | $3.49 | FREE MINUTES |
| Call Now | WMX | 📷 | Tips and Basics for dieting(mass or definition) | New | $1.75 | FREE MINUTES |
| Call Now | 770 | | Vegetarian Questions? | New | $0.85 | FREE MINUTES |
| Call Now | 4therapyTest | | Help with nutrition test | New | $0.50 | FREE MINUTES |
| Call Now | HolisticHelp | 📷 | It's Not Your Fault Your Overweight | New | $1.50 | FREE MINUTES |
| Call Now | MissDebi | 📷 | Visualization for Permanent Weightloss | New | $1.70 | FREE MINUTES |
| Call Now | AndreaMSRD | 📷 | Healthy Eating Tips | New | $1.99 | FREE MINUTES |
| Call Now | Margie RD NSCA-CPT | 📷 | Registered Dietitian - Nutrition & Fitness Expert | New | $1.99 | FREE MINUTES |
| Call Now | Lauren MS RD | 📷 | Get Expert Advice from a Registered Dietitian Now! | New | $1.99 | FREE MINUTES |
| Call Now | Robert Ross | 📷 | Natural Health & Weight Loss with Raw Living Foods | 0 | $1.00 | FREE MINUTES |
| Call Now | jbvo | | How to burn fat and without dieting | 0 | $0.75 | FREE MINUTES |
| Call Now | andrew2416 | | Personal Health & Dietary Profiling | 0 | $2.50 | FREE MINUTES |
| Call Now | FONEMED Family Nurse | 📷✓ | Weight Loss Information & Support from an RN | -1 | $2.32 | FREE MINUTES |
| Call Now | marz63 | | Your Personal Trainer | -2 | $1.85 | FREE MINUTES |
| Call Now | axelf | | guaranteed weight loss for obese people | -2 | $5.99 | FREE MINUTES |
| Call Now | jiffy41 | | Teens with weight problems | -6 | $0.50 | FREE MINUTES |
| Mail Now | Cathy Marie | 📷 | I have lost 250 lbs! LET ME HELP YOU! | 13 | $2.40 | FREE MINUTES |

USER INTERFACE SCREEN 600

FIG. 5

USER MESSAGE SCREEN 630

FIG. 6

VOICE MAIL REVIEW SCREEN 660

APPARATUS AND METHOD FOR ENSURING A REAL-TIME CONNECTION BETWEEN USERS AND SELECTED SERVICE PROVIDER USING VOICE MAIL

This application is a continuation application of Ser. No. 09/947,591, filed on Sep. 5, 2001, now U.S. Pat. No. 6,704,403, entitled "An Apparatus and Method for Ensuring a Real-Time Connection Between Users and Selected Service Provider Using Voicemail", currently pending, and claims priority therefrom.

FIELD OF THE INVENTION

The invention relates generally to providing users with service providers in a field of service desired by the user. In particular, the invention relates to a method and apparatus for ensuring a real-time connection between users and selected service provider using voice mail.

BACKGROUND OF THE INVENTION

Consumers interested in acquiring services must first identify a service provider who is capable of providing the required services. At present, this usually means perusing a telephone directory, which can become frustrating and time-consuming if the service providers telephoned are not immediately available. In addition, a simple telephone call does not enable the service provider to charge a fee according to the time spent with his/her customers.

Systems now exist that enable providers of services to charge fees for the time spent delivering the service. 1-900 phone numbers will charge the seeker of services according to the time spent receiving the service and will transfer this payment, or a portion of it, to the provider.

Each 1-900 number, however, has a very narrow scope— "Hear your Horoscope," for instance. If a seeker would like to hear an entirely different service—"Your Local Weather," for instance—he/she would have to dial a completely different 1-900 number. Similarly, each 1-900 number is quite rigid in the price, quality, and specificity of its service.

However, current systems now exist that enable seekers to locate service providers according to a wide range of price, quality and specificity of service (U.S. application Ser. No. 09/414,710). Such systems also make is possible for the service provider and buyer to be connected and communicate in real time. Unfortunately, a real-time communications connection is not always established between service seekers and service providers. Service provider unavailability is a primary cause for failure to establish the real-time communication link with the user.

Therefore, there remains a need to overcome one or more of the limitations in the above described existing art which are satisfied by the inventive structure and method described hereinafter.

SUMMARY OF THE INVENTION

The present invention overcomes the problems in the existing art described above by providing a method and apparatus for ensuring a real-time connection between users and selected service provider using voice mail. The present invention is a system through which seekers of a wide array of services can select, contact, converse, and pay for a service provider using a real-time communications device such as the telephone. The invention enables the service seeker to locate a service provider by communicating the name of a profession, such as "psychiatrist," which is recognized by the system's software. In a similar fashion, the seeker can then specify a price range, quality rating, language, and keyword descriptors of the service provider. Within the desired parameters, the system offers service providers who have made themselves available to render services at the present time.

Once the appropriate available service provider is selected, the system automatically connects the service seeker with the service provider for a live conversation. However, in the event of service provider unavailability, the system enables a service seeker to leave a voice mail message for the selected service provider. Consequently, the system can facilitate a real-time communications link between the service seeker and service provider in response to review of the voice mail by the service provider. The system automatically bills the service seeker for the time spent conversing with the service provider and compensates the service provider accordingly.

Advantages of the invention include providing users with the capability to engage in a live conversation with a selected service provider via a telephone. Contrary to prior systems, requiring an internet connection and browser to receive such services, the equivalent is now provided by a simple voice transmission medium such as the telephone. As a result, virtually anyone can benefit from the capabilities provided by the present invention. The system also allows providers of a field of service to be compensated for supplying their expertise to a user. In addition, the system facilitates a real-time communications connection between a service seeker and a selected service provider once the service provider becomes available following an initial unavailability.

BRIEF DESCRIPTION OF THE DRAWINGS

The present invention is illustrated by way of example, and not by way of limitation, in the figures of the accompanying drawings and in which:

FIG. 3 depicts a web page, including a list of fields of service from which service providers can be selected for live conversations in accordance with a further embodiment of the present invention;

FIG. 4 depicts a web page presented to a service provider desiring inclusion in a service provider database of the present invention in accordance with a further embodiment of the present invention;

FIG. 5 depicts a web page illustrating a user interface screen presented to a user desiring to select a service provider in accordance with an embodiment of the present invention;

FIG. 6 depicts a web page illustrating a user message screen presented to a user when the service provider system fails to establish a connection with a selected service provider in accordance with a further embodiment of the present invention;

DETAILED DESCRIPTION

The present invention overcomes the problems in the existing art described above by providing a method and apparatus for ensuring a real-time connection between users and selected service provider using voice mail. In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the steps of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

System Architecture

Figure 1:
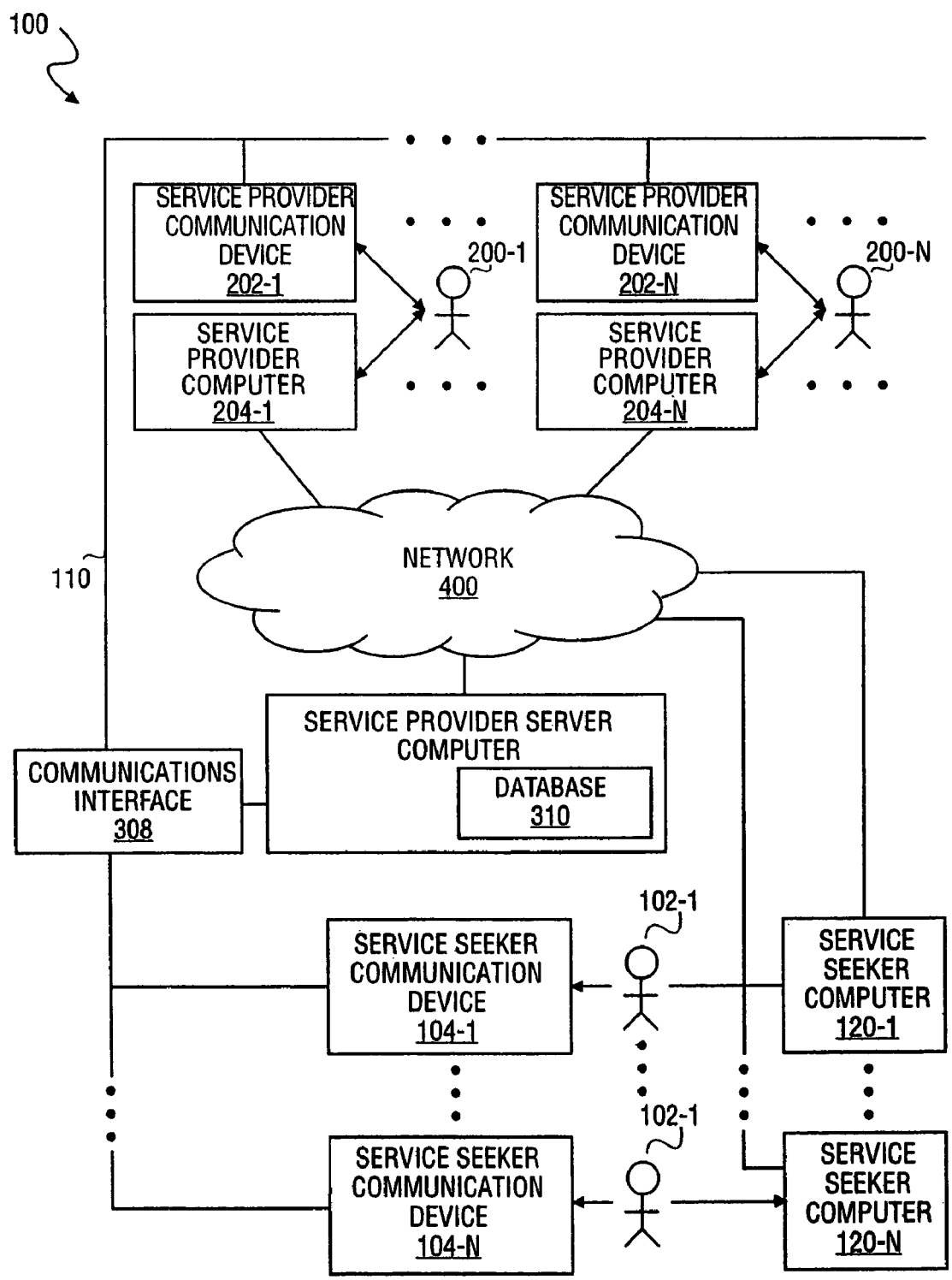
FIG. 1 depicts a block diagram illustrating a system in which a service provider system, in accordance with the present invention, may be implemented.

FIG. 1 depicts one embodiment of a service provider system architecture 100 in which the systems and methods of the present invention may be incorporated. The service provider system 100 includes one or more service seeker computers 120 (120-1, . . . , 120-N) connected through a network 400 (such as an Intranet, an Extranet, a LAN or a WAN such as the Internet) to a host computer or web server ("service provider server computer") 300. One or more service provider computers 204 are also connected to the service provider server computer 300 via the network 400. Persons skilled in the art will recognize that the service provider server computer 300 may include one or more computers working together to provide the controller computer functions described herein.

The system 100 also includes one or more service providers 200 (200-A, . . . , 200-N) each having a communications device 202 (202-1, . . . , 202-N) that is connected to a communications network 110. One or more service seekers (users) 104 (104-1, . . . , 104-N) are also included, each having a communications device 104 (104-A, . . . , 104-N) that is connected to the communications network 110. In accordance with the teachings of the present invention, a user 102 can send a request 106 (106-A, . . . , 106-N) via the communications device 104 or service seeker computer 120, which is received by the service provider server computer 300. As described in further detail below, the service provider server computer 300 can then automatically connect the user 104 to a selected service provider 200 for a live conversation either via the communication devices 102 and 202 or the computers 120 and 204.

The communications network 110 generally refers to any type of wire or wireless link enabling the transmission of voice data such as, but not limited to, a public switched telephone network, a wireless communications network, a local area network, a wide area network or a combination of networks. The communications devices 104 and 200 generally refer to any type of device capable of receiving speech from a user and providing the speech to a destination via a communications network, such as the communications network 110. In an embodiment of the present invention, the communications network 110 is a public switched telephone network and the communications device 104 and 200 are telephones.

Figure 2A:
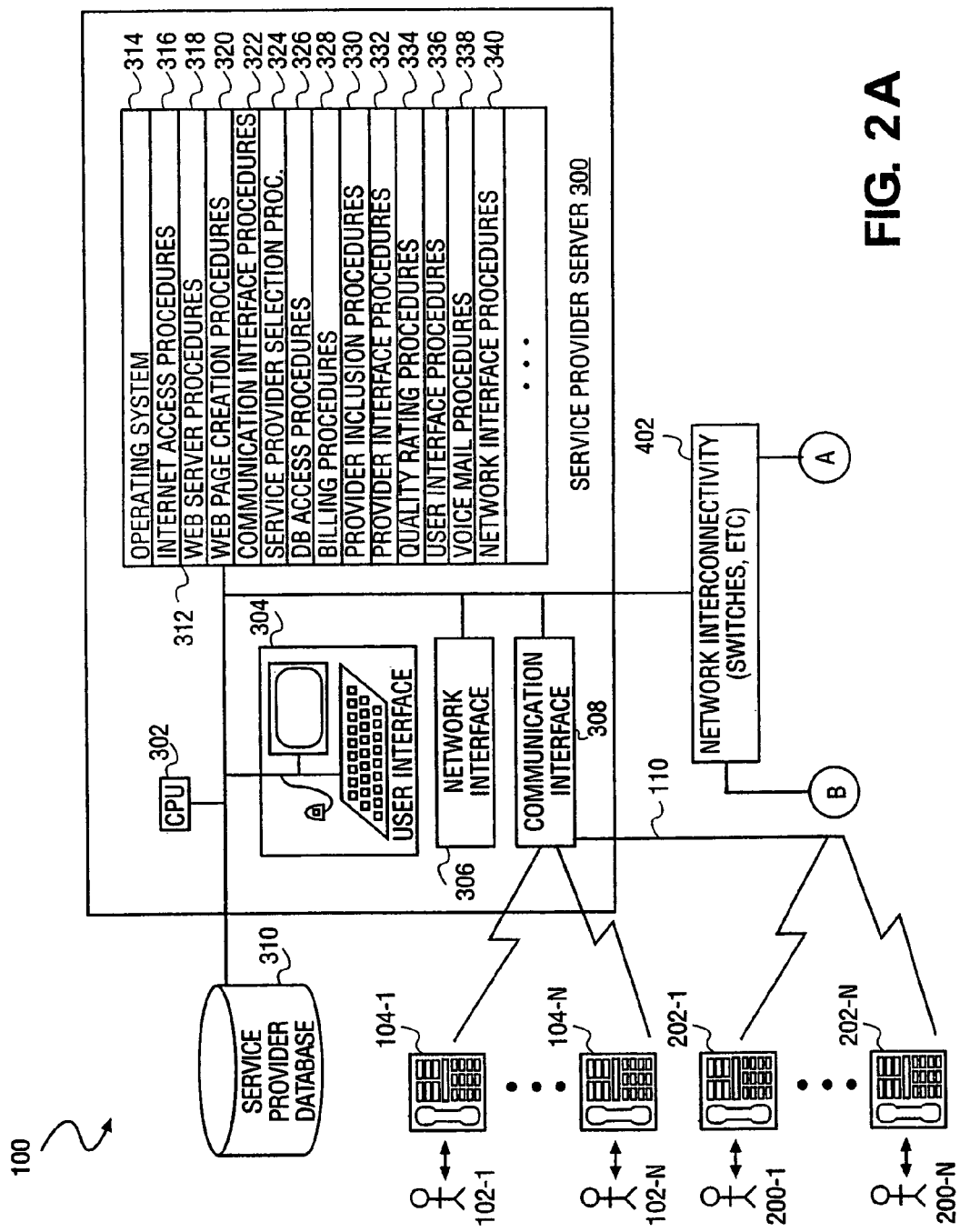
FIG. 2 is a block diagram further illustrating the service provider system as shown in FIG. 2.
Figure 2B:
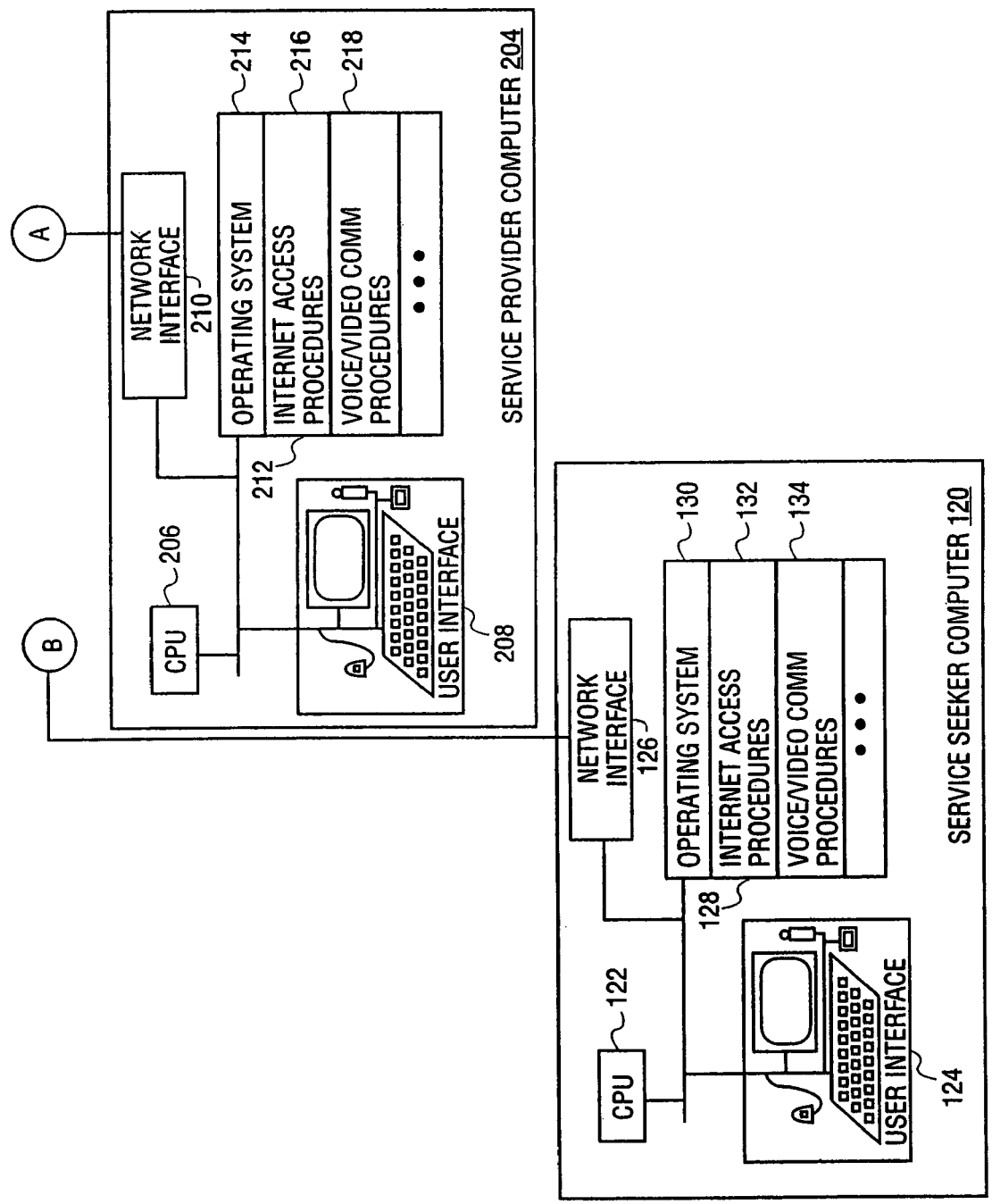

FIG. 2 further illustrates the service provider system 100, including the service provider server computer 300, the service seeker computer 120 and the service provider computer 204. The service provider server computer 300 includes a central processing unit (CPU) 302, a user interface 304, a communications interface 306, a voice interface 308, a service provider database 310 and a memory 312. The service provider server computer 300 can be any type of computing device, such as, but not limited to, desktop computers, work stations, lap tops and/or mainframe computers. The communications interface 308 is used to communicate with users 102 and service providers 200, as well as other system resources not shown. The communications interface 308 receives a voice request 106 provided by user 102 through a communications device 104, which is provided over the communications network 110. The communications interface 308 provides digitized voice requests to the service provider server computer 300 for interactive voice recognition, including voice processing, speech recognition and text-to-speech processing. The network interface 306 is used to connect a user computer 120 to a selected service provider computer 202 for real-time communication, such as voice over Internet Protocol (IP), video over-IP, or the like. The memory 312 of the voice portal server computer 300 may be implemented as RAM (random access memory) or a combination of RAM and non-volatile memory, such as one or more magnetic disk storage units. The memory can contain any of the following:

an operating system 314;
internet access procedures 316;
web server procedures 318;
web creation procedures 320;
communications interface procedures 322 for receiving the voice request 106 from the user 102 via the communications interface 308 and connecting the user 102 with a selected service provider 200 for a live conversation via the communications devices 104 and 202;
service provider selection procedures 324 for providing the user 102 with a list of fields of service providers provided by the service provider system 100, as well as lists of service providers matching a field of service selected by the user 102;
database (DB) access procedures 326 for querying the database 310 in order to return records of service providers matching a field of service selected by the user 102;
billing procedures 328 for billing the user 102 following a live conversation with the service provider 200, as well as compensating the service provider 200 for the live conversation and collecting a premium fee for the service provider system 100;
provider inclusion procedures 330 for providing an on-line interface to service providers 200 requesting inclusion in the service provider database 310 in order to provide live services via the service provider system 100 to perspective users 102;
provider interface procedures 332 for providing both an on-line interface, as well as a voice interface, allowing service providers 200 to update information in the service provider database 310, including times of availability;
quality rating procedures 334 for receiving a quality rating for a service provider 200 following a live conversation with a user 102 based on the user's evaluation of the services provided by the service provider 200;
user interface procedures 336 for providing the user 102 with an online interface as well as voice interface for providing listing of fields of service available from the service provider system 100, as well as receiving various descriptors for narrowing the search of service providers, including acceptable price ranges, acceptable quality ratings and specific languages;
conversation monitoring procedures 338 for measuring the duration of the live conversation between the user 102 and the service provider 200; and
network interface procedures 340 for directing the network interface 306 is used to connect a user computer 120 to a selected service provider computer 202 for real-time communication, such as voice over Internet Protocol (IP), video over-IP, or the like;
other procedures and files.

FIG. 2 also illustrates the service seeker computer 120, which includes a CPU 122, a user interface 124, a memory 128 and a communications interface 126. The communications interface 126 is used to communicate with the service provider server computer 300, as well as other system resources not shown. Additionally, the service seeker computer may include a microphone as well as a digital video camera for enabling voice over-IP or video over-IP communication between a user 102 and a selected service provider 200. The memory 128 of the service seeker computer 120 may be implemented as RAM (random access memory) or a combination of RAM and non-volatile memory, such as one or more magnetic disk storage units. The memory 128 can contain the following:

an operating system 130;
internet access procedures 132;
voice/video communication procedures 134 for enabling voice over-IP or video over-IP communication between a user 102 and a selected service provider 200; and
other procedures and files.

FIG. 2 also illustrates the service provider computer 202, which includes a CPU 204, a user interface 206, a memory 210 and a communications interface 208. The communications interface 208 is used to communicate with the voice portal server computer 300, as well as other system resources not shown. Additionally, the service provider may include a microphone as well as a digital video camera for enabling voice over-IP or video over-IP communication between a user 102 and a selected service provider 200. The memory 210 of the service provider computer 202 may be implemented as RAM (random access memory) or a combination of RAM and non-volatile memory, such as one or more magnetic disk storage units. The memory 210 can contain the following:

an operating system 212;
internet access procedures 214;
voice/video communication procedures 216 for enabling voice over-IP or video over-IP communication between a user 102 and a selected service provider 200; and
as well as other procedures and files.

Figure 4:
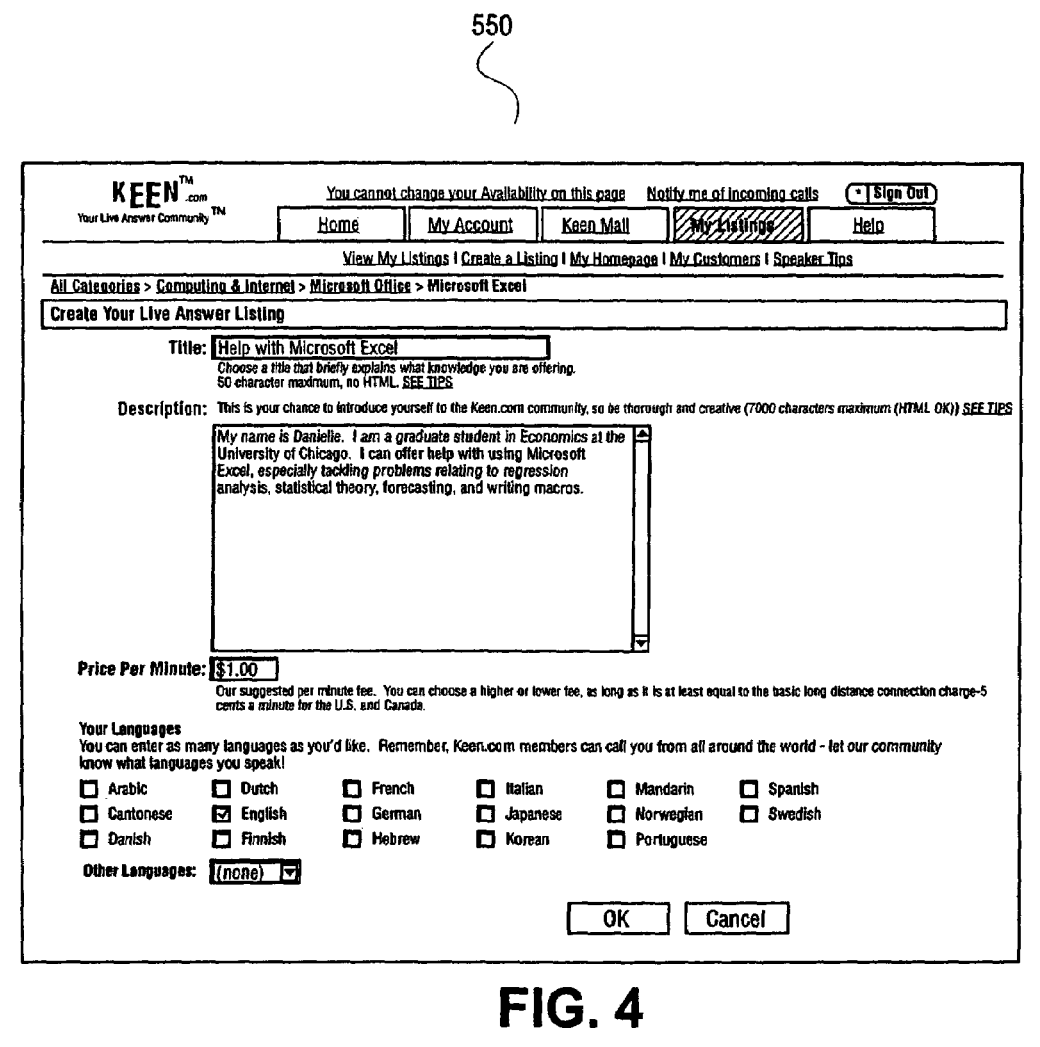

The embodiment depicted in FIG. 2 includes a service provider database 310 containing information about a wide array of service providers 200. In order to present themselves to their potential clients, service providers 200 list themselves in this database 310. In one embodiment, this is done through the use of an Internet web site, via web pages 500 and 550, as depicted in FIGS. 3 and 4. The service provider 200 registers his/her name and phone number using the web page 550, along with a description of the service that he/she offers. Possible examples of the wide array of fields of service available from the service provider system 100 include, but are not limited to, the fields of service depicted in FIG. 3. The description includes key words describing the field of service. The description also includes a price for rendering the service, most commonly, but not restricted to a per-minute price.

The service provider 200 then informs the service provider system 100 of the times when he/she is available to receive calls. This can be done by creating a schedule of suitable times at the web site 500 or by simply clicking on an "on call"/"off call" switch at the web site 500. Switching service provider 200 availability status can also be done through a voice transmission medium such as a telephone. The service provider 200 calls the central phone number, identifies himself/herself with a password, then presses the telephone keypad "1" or "2", for example, to indicate "on call" or "off call" status, respectively. Once the database 310 contains the phone numbers of service providers, email address, network address, descriptions of their services, their prices, and their real-time availability status, the service provider system 100 can provide services to users 102 desiring corresponding services.

In one embodiment a telephone is used as part of the delivery mechanism or communications device 104 and 202 of the service provider system 100. A user 102 seeking services dials a central telephone number and then listens to a series of options. The seeker indicates which type of service he would like to receive by speaking the name of a profession, such as "psychiatrist," which is processed by the system's voice interface 308 using voice interface procedures 322. Alternatively, the user 102 can listens to a series of professions and press the numerical keypad to select one. This process continues until the desired field of service is selected.

Once the user 102 has indicated a field of service using the service provider selection procedures 324, the service provider system 100 searches its database 310 for service providers in that field using the DB access procedures 326. The user 102 can then further narrow down the selection of service providers by speaking keywords, such as "psychiatry—depression." The user 102 can also indicate a known specific service provider by speaking the service provider's name or punching in the service provider's code number into a telephone keypad.

The service provider selection procedures 324 in conjunction with the user interface procedures 338 allow the user 102 to further narrow the search for a service provider 200 by speaking—or pressing into the telephone keypad—a price, such as "50 cents per minute." The service provider server computer 300 will then narrow the search in the database 310 for service providers 200 that match the price range. The user 102 can further narrow the search for a service provider 200 by speaking—or pressing into the telephone keypad—a quality rating, such as "three stars or higher." The server computer 300 will then narrow the search in the database 340 for service providers 200 which match the quality rating range. Finally, the user 102 can further narrow the search for a service provider by speaking—or pressing into the telephone keypad—the name of a language, such as "Spanish." The server computer 300 will then narrow the search in the database 310 for service providers 200 who can speak this language.

Alternatively, a user 102 may select a service provider using the user interface screen 600 as depicted in FIG. 5. Once the user 102 has established a connection with the service provider system 100, the user can query the various fields of service provided by the service provider system 100. Generally, the user 102 will make a selection based on the criteria described above for performing voice recognition of a voice request received from the user 102.

Once a service provider 200 with the desired characteristics has been chosen, the service provider system 100 will automatically connect the user 102 with the selected service provider 200. Since the service provider 200 has informed the service provider system 100 that he/she is "on call" and ready to receive calls, the service provider system 100 can reach him/her with a simple phone call via the communications interface 308. Once both the user 102 and provider 200 are on the phone line 110, the service provider system 100 conferences the two phone calls together, enabling services to be rendered in a live conversation. The system keeps track of the time spent on the phone call using the conversation monitoring procedures 340. The user 102 is then billed accordingly, and the funds are transferred to the provider 200 using the billing procedures 328.

Unfortunately, the system cannot always establish a real-time communications connection between the user 102 and the selected service provider 200. Generally, the system will attempt to contact the selected service provider via the service provider communications device 202. The system will attempt to contact the selected service provider 200 a predetermined number of times, which is, for example, two attempts. In the event that the system fails to establish a connection with the selected service provider 200, the user is presented with the user message screen 630, as depicted with reference to FIG. 6.

Using the user message screen 630, the user can record a message for the selected service provider 200. Once the message is completed, the system 100 transmits and notifies the selected service provider 200 of the voice mail message. When the selected service provider reviews the voice mail message, the selected service provider 200 has the option of establishing a connection with the user 102 at such time. If the service provider 200 establishes a connection with the user, the service provider will be compensated an amount that is generally deducted from a service provider when they are unavailable at an indicated time of availability.

At the end of the phone call, the system prompts the user 102 to rate the quality of the received service using the quality rating procedures 338. A quality rating of one to five stars, for instance, can be spoken into the telephone 104 or pressed into the telephone keypad. The service provider system 100 records this rating, and in turn, can store the quality rating in the database 310 and use it as a quality-selection criterion the next time a user 102 calls. Procedural methods for implementing the teachings of the present invention are now described.

Operation

Figure 8:
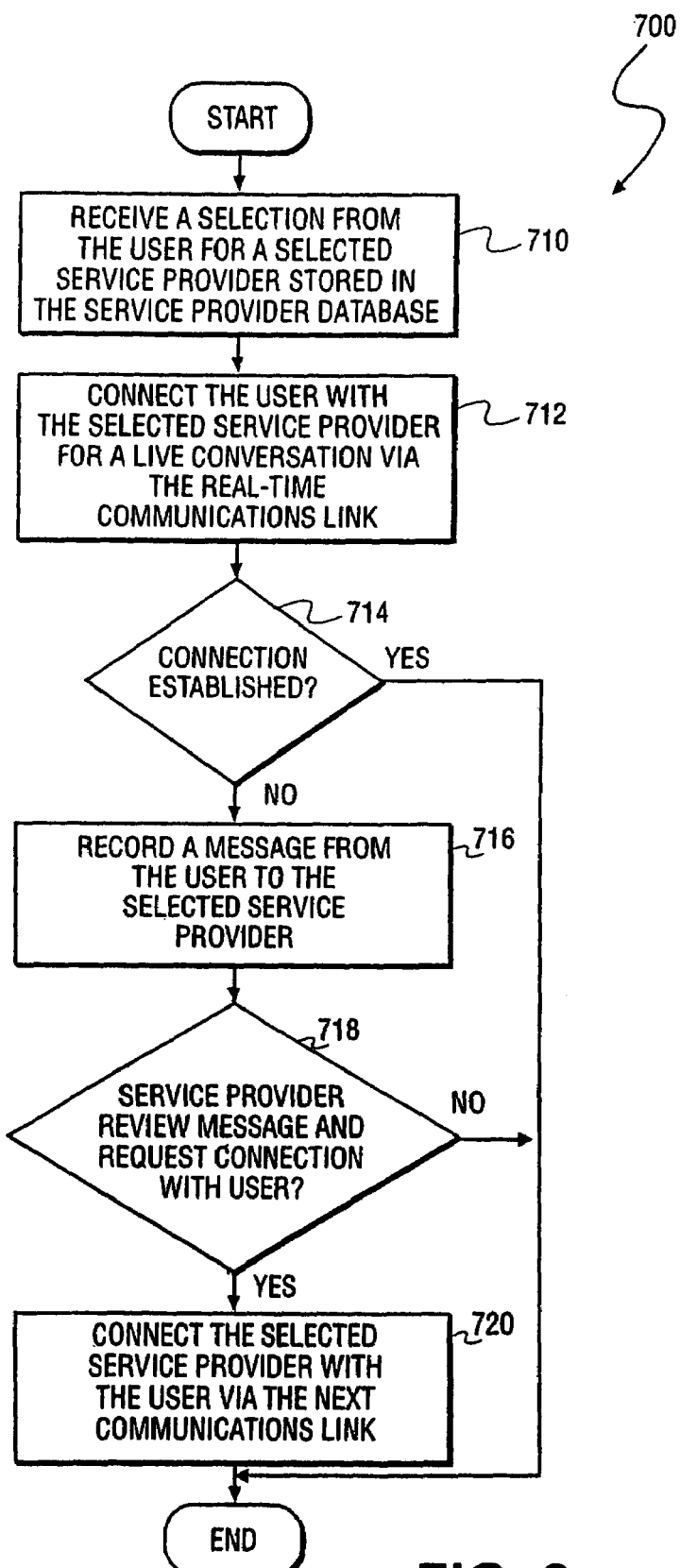
FIG. 8 depicts a flow chart illustrating a method for ensuring a connection between a user and a selected service provider in accordance with an embodiment of the present invention.

Referring now to FIG. 8, a method 700 is depicted for ensuring that a user 102 request 106 to a service provider system 100 results in a live conversation between a user 102 and a selected service provider 200, for example, in the service provider system 100 as depicted in FIGS. 1 and 2. At step 710, the service provider server computer 300 receives a selection from the user for a selected service provider 200 stored within the service provider database 310. At step 712, the service provider server computer 300 uses, for example, the voice interface 308 to connect the user 102 with the selected service provider 200 for a live conversation via the voice transmission mediums 104 and 202. The communication interface procedures 322 handle receipt of the request 106 and connection of the user 102 with the selected service provider 200. However, the voice interface procedures 322 may be performed by a human operator. Alternatively, the user may select a service provider 200 via the user interface screen 600, as depicted in FIG. 5, using the network interface 306 and network interface procedures 340.

The establishment of the real-time communications connection between the user 102 and the selected service provider 200, as described in step 712, is generally automatically performed by the system 100. In one embodiment, when the user establishes an internet connection between the user computer 120 and the service provider server 300, via network interface 306, the user 102 may be given the option as to the method for establishing a connection with the selected service provider 200. As such, the service provider server 300 may connect the user telephonically via communications devices 104 and 202. Alternatively, the user may request a network connection with the selected service provider via user computer 120 and selected service provider computer 204, using the network interface procedures 340.

In one embodiment, when the user 102 selects a telephonic connection with the selected service provider 200, the service provider server computer 300 will place a telephone call to the user 102 via a connection separate from the internet connection between the user 102 and the service provider server computer 300. In addition, the server computer 300 will place a telephone call to the selected service provider 200. Once a telephone call between the server computer 300 and the selected service provider 200 is established, the server computer 300 will interface both calls via communications interface 308, such that the user 102 and the selected service provider 200 may telephonically communicate via communications devices 104 and 202. Alternatively, if the user 102 has established a telephonic connection with the server computer 300, via the communications device 104, the server computer 300 will generally connect the user with the selected service provider via communications devices 104 and 202, thereby enabling telephonic communication between the user 102 and the selected service provider 200.

At step 714, the system 100 determines whether a successful connection was established between the user 102 and the selected service provider 200. When the system 100 fails to establish a successful connection, step 716 is performed. At step 716, the system allows the user 102 to record a message for the selected service provider. At step 718, it is determined whether the service provider 200 has reviewed the voice mail message. Once the service provider 200 reviews the voice mail message, via for example, the voice mail review screen 660 as depicted in FIG. 7, the service provider 200 has the option to establish a connection with the user 102 at such time.

Figure 7:
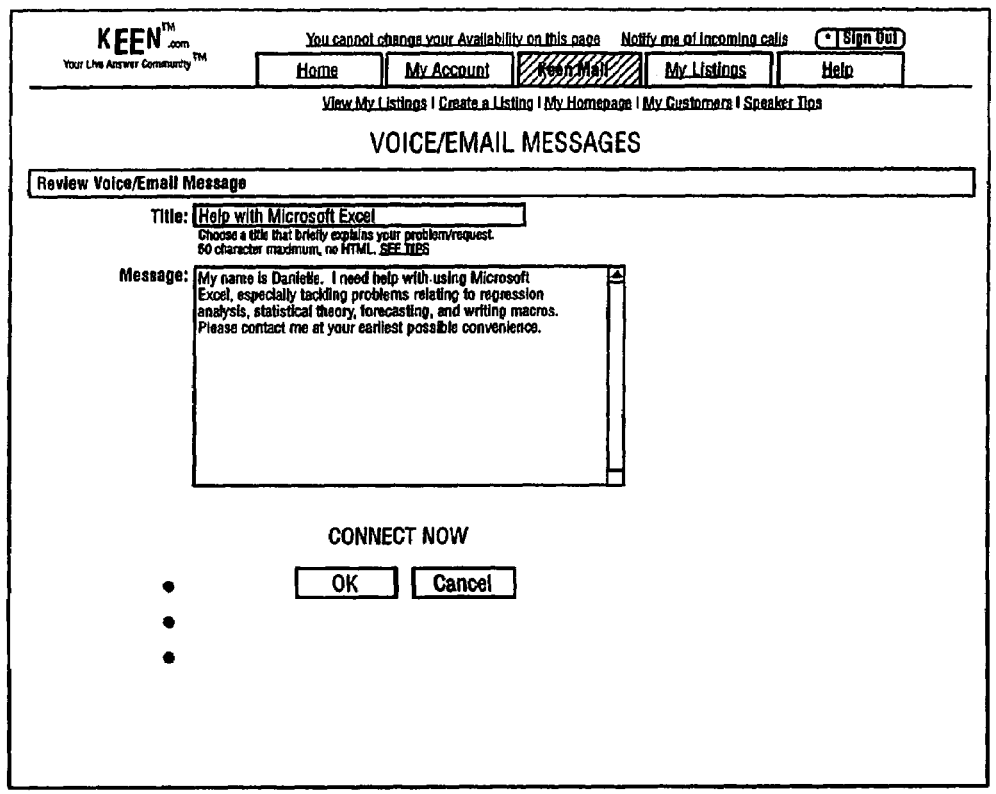
FIG. 7 depicts a web page illustrating a service provider voice mail review screen presented to a service provider after missing an attempted connection with a user in accordance with a further embodiment of the present invention.

At step 720, the system 100 automatically connects the selected service provider 200 with the user 102 via a real-time communications link, for example, the communications devices 104 and 202 when the user clicks the "OK" button (FIG. 7). The failure of the system 100 to establish a real-time communications link between the user 102 and a selected service provider 200 will result in a deduction of a predetermined amount from the selected service provider 200. The system will generally telephonically contact the user 102 and the service provider 200 via communications devices 104 and 202. Alternatively, the user 102 and selected service provider may be connected with and directly communicate via their computer 120 and 204 using video over-IP or voice over-IP with the network interface procedures 340.

Figure 9:
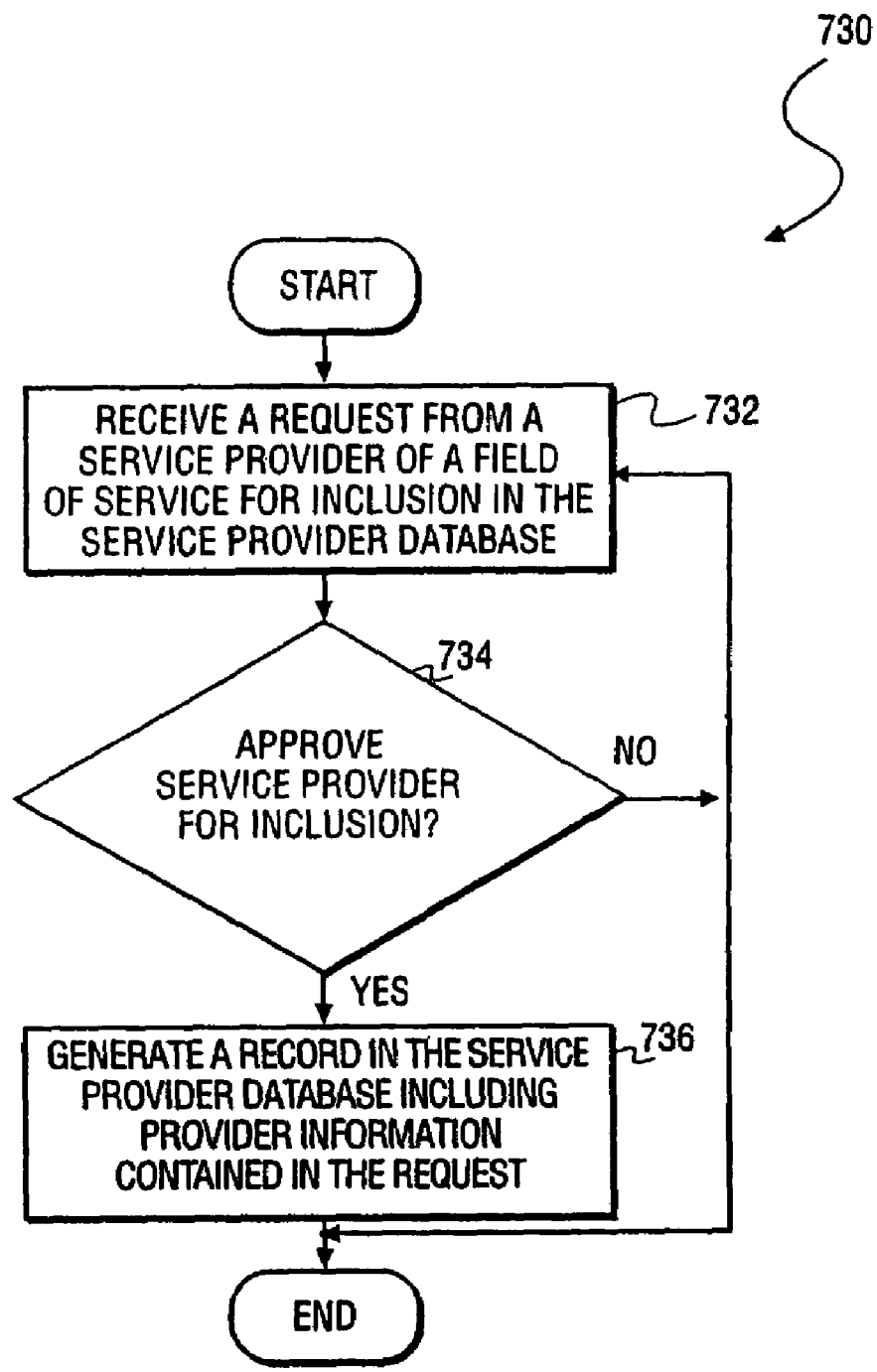
FIG. 9 depicts a flow chart illustrating a method used by a service provider desiring inclusion in the service provider database in accordance with a further embodiment of the present invention.

FIG. 9 depicts additional method steps 730 for adding service providers 200 to the service provider system 100. At step 732, the server computer 300 receives a request from a service provider 200 of a field of service requesting inclusion in the service provider database 310. At step 734, the service provider system 100 determines whether to approve the service provider 200. Approval of a service provider 200 includes, for example, adding an additional field of service to the service provider system 100 for a new service provider 200. At step 736, when the service provider 200 is approved, the server computer 300 generates a record in the service provider database 310, including provider information contained in the voice request 106. Acceptance of the provider 200 and generation of provider records in the service provider database 310 is performed by the server computer 300 using provider inclusion procedures 330. The provider information stored in the database 310 can include a service price, real-time service provider availability, specific expertise of the service provider, telephone number, network address, e-mail address, languages spoken by the provider and a quality rating for the service provider.

Figure 10:
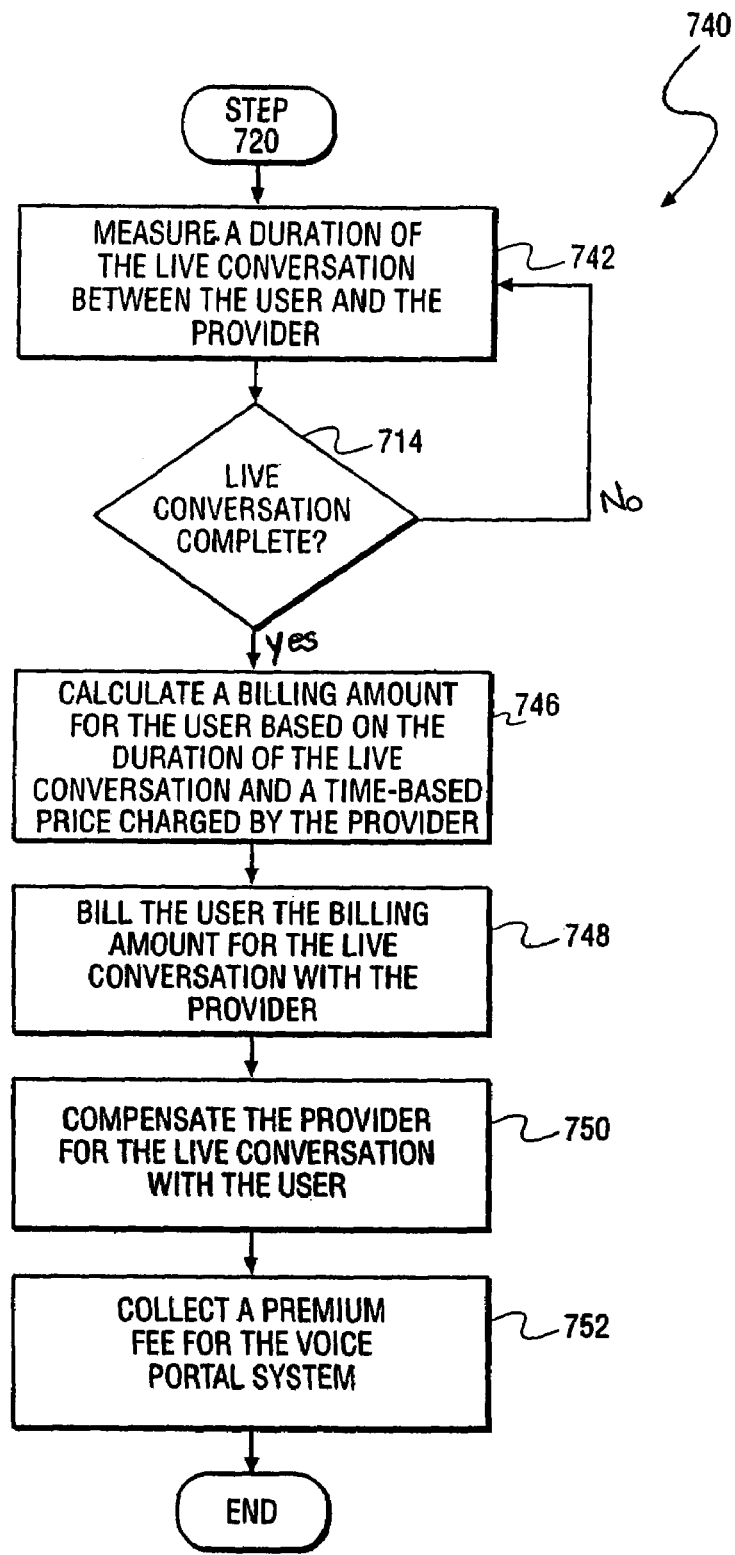
FIG. 10 depicts a flow chart illustrating a method for billing a user and compensating a service provider following a live conversation in accordance with a further embodiment of the present invention.

FIG. 10 depicts additional method step 740 for billing a user 102 and compensating a service provider 200 for a live conversation between the provider 200 and the user 102. At step 742, the server computer 300 measures a duration of the live conversation between the user 102 and the provider 200 using the conversation monitoring procedures 340. Once the live conversation is complete, the server computer 300 calculates a billing amount for the user 102 based on the duration of the live conversation and a time-based price charged by the service provider 200. The billing amount is generated by the server computer 300 using the billing procedures 328. However, the billing amount may be a flat fee. Otherwise, the server computer 300 continues measuring the duration of the live conversation between the user 102 and service provider 200 at step 742. The time-based price charged by the service provider 200 includes, for example, a per minute price, hourly price or a flat fee.

At step 748, the server computer 300 bills the user 102 the billing amount for the live conversation with the provider 200. Generally, users 102 of the service provider system 100 will have a billing account set up with the system 100. The service provider system 100 can then either deduct from the user's account or charge the billing amount, for example, to a credit card submitted by the user 102. At step 750, the voice portal service provider system 100 compensates the provider 200 for the live conversation with the user 102. Finally, at step 752, the server computer 300 collects a premium fee for the service provider system 100 as a predetermined percentage of the billing amount, for example, ten percent.

Figure 11:
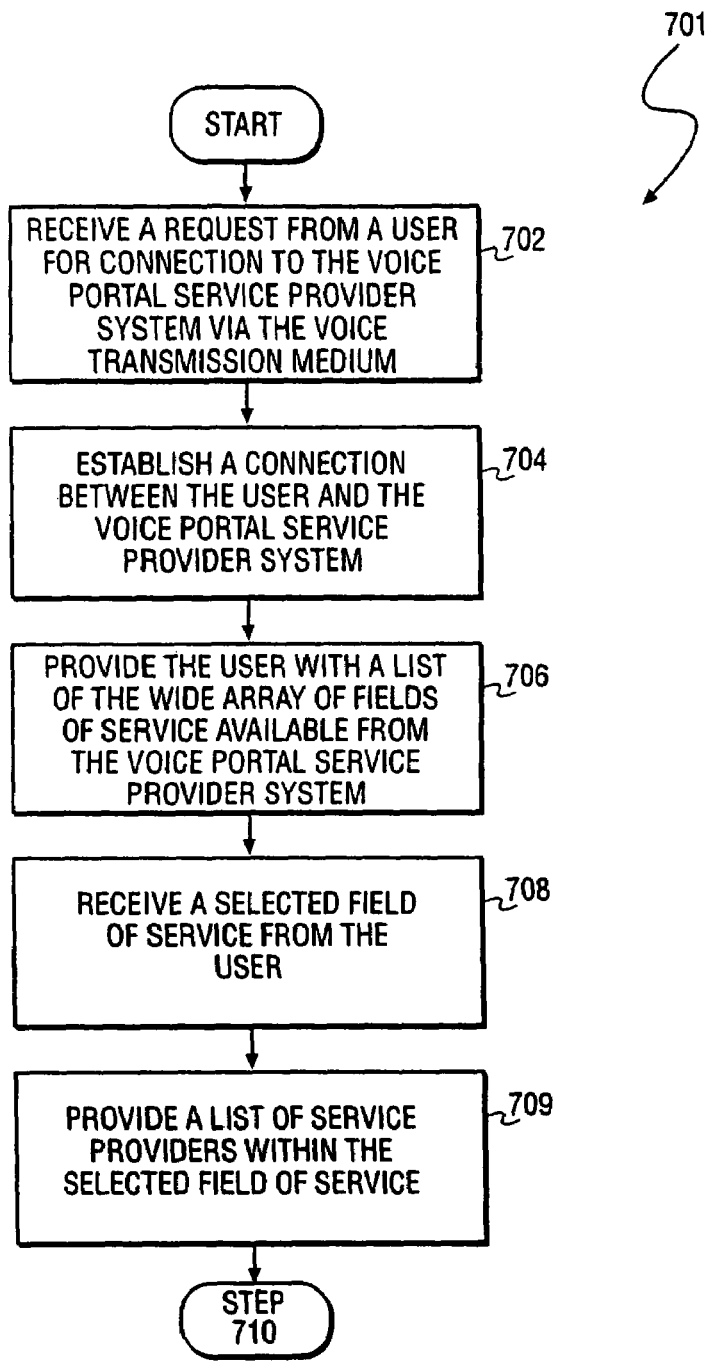
FIG. 11 depicts a flow chart illustrating a method for connecting a user desiring a service provider to the service provider system in accordance with a further embodiment of the present invention.

FIG. 11 depicts additional method step 701 for connecting a user 102 to the service provider system 100. At step 702, the server computer 300 receives a request from a user 102 for connection to the service provider system 100 via, for example, the communications device 104. The communications device 104 is, for example, a telephone. At step 704, the server computer 300 establishes a connection between the user and the system 100 via the communications interface 308. At step 706, the server computer 300 provides the user 102 with a list of the wide array of fields of service available from the service provider system 100 using the user interface procedures 338.

At step 708, the server computer 300 receives a selected field of service from the user 102. Finally, at step 709, the server computer 300 provides a list of service providers within the selected field of service provided by the user. The list generally indicates whether each individual service provider is currently available to telephonically communicate with the user at the time when the user is viewing the list. The list generally further indicates individually whether a service provider is currently on a telephone call with another user when the user is viewing the list. The list also includes a compensation rate for each listed service provider.

Figure 12:
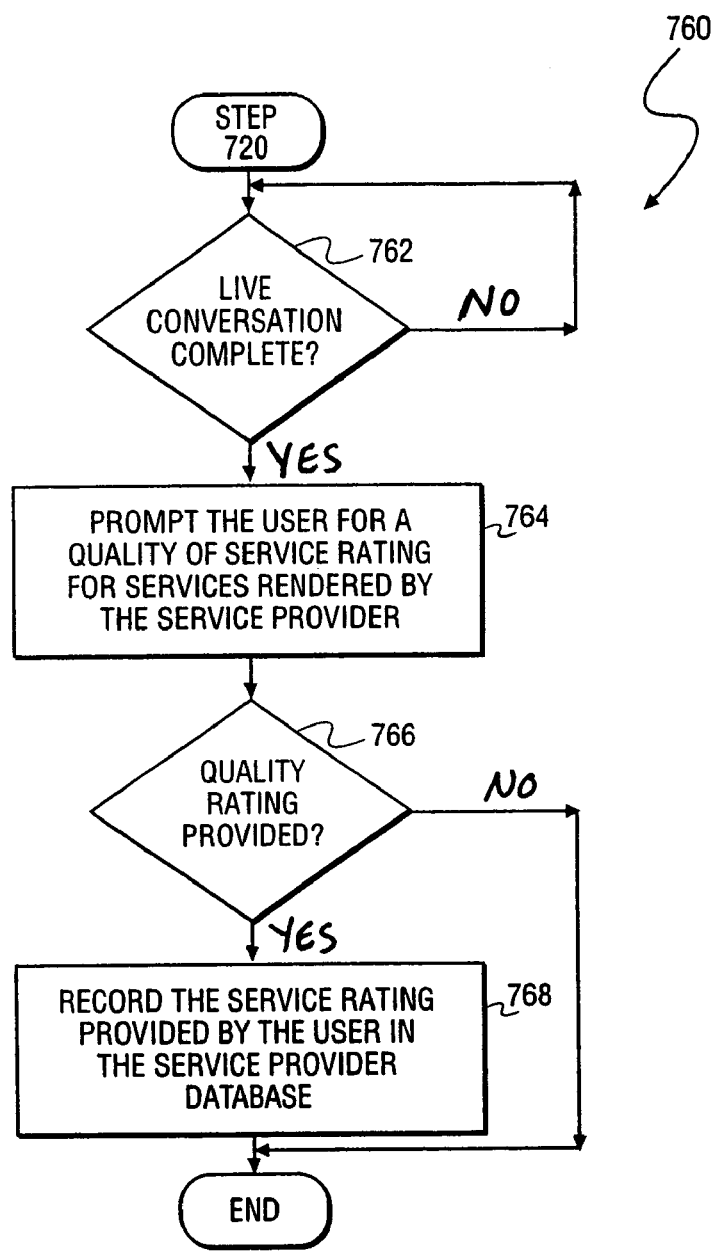
FIG. 12 depicts an additional method for receiving a quality rating from a user regarding services provided by a service provider in accordance with a further embodiment of the present invention.

FIG. 12 depicts additional method step 760 for receiving a quality rating from a user 102 regarding the live conversation with the service provider 200. At step 762, it is determined whether the live conversation is complete. At step 664, the server computer 300 prompts the user 102 for a quality of service rating for services rendered by the service provider 200. At step 766, it is determined whether a quality rating is provided by the user 102. At step 768, the server computer 300 records the service rating provided by the user 102 in the service provider database 310. As described above, the request 106 provided by the user 102 can include the category of service providers, a maximum price range for service providers, desired times of availability for service providers, specific expertise of the service provider, a language spoken by the service provider and a minimum quality rating for the service provider. These criteria are used by the server computer 300 and provided to service provider selection procedures 324 in order to narrow the list of service providers 200 for the user 102 to choose from.

Figure 6:
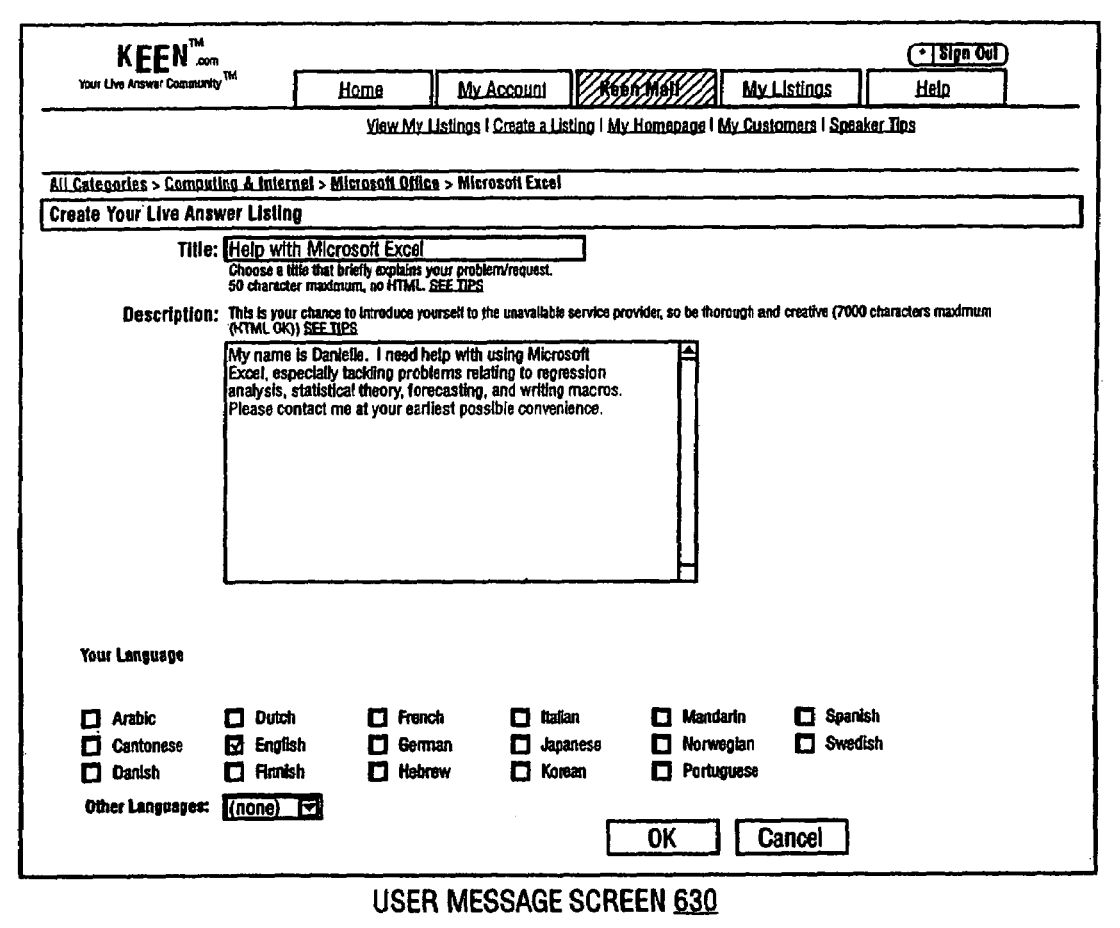
Figure 13:
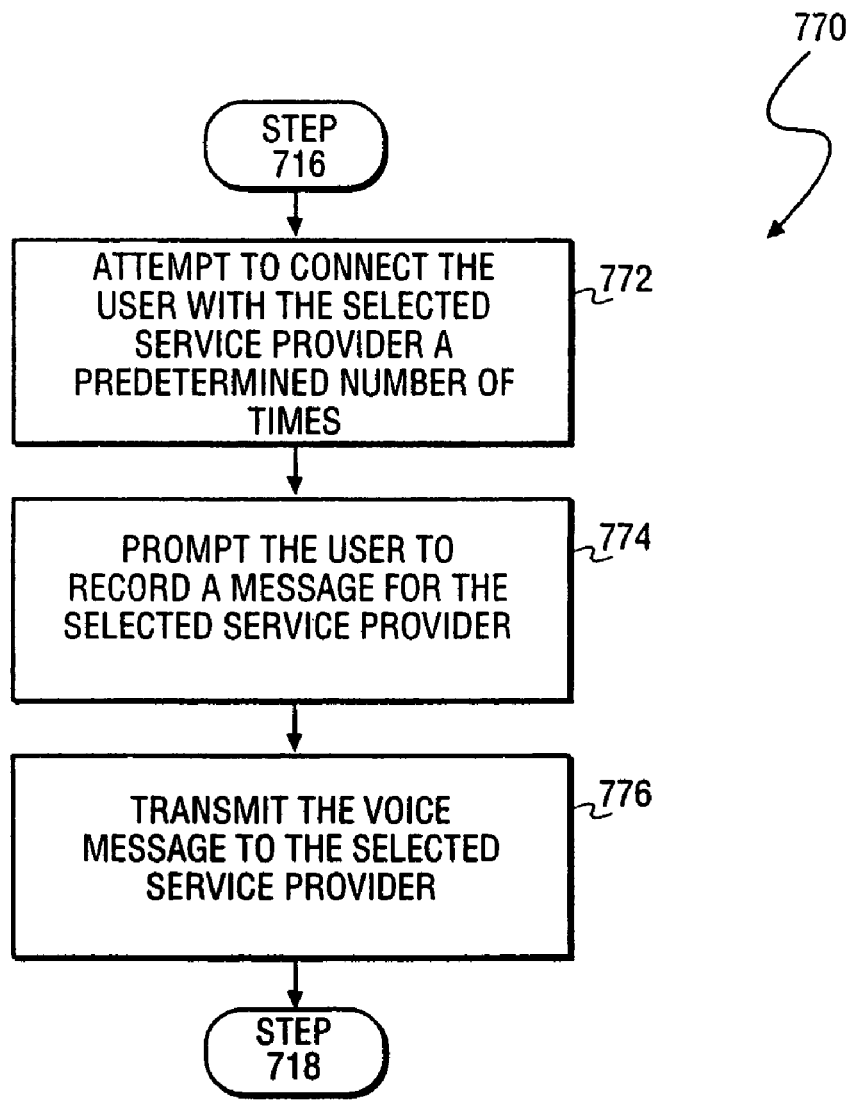
FIG. 13 depicts an additional method for ensuring the establishment of a real-time communications link for providing a live conversation between a user and a selected service provider in accordance with a further embodiment of the present invention.

Referring now to FIG. 13, FIG. 13 depicts additional method steps 770 for ensuring the establishment of a real-time communications connection between the user 102 and the selected service provider 200 in order to guarantee a live conversation therebetween. At step 772, the system 100 attempts to connect the user with the selected service provider a predetermined number of times. Generally, the system 100 will repeat the connection attempt two times before acknowledging the failure of the connection between the user 102 and the selected service provider. At step 774, the system 100 prompts the user 102 to record a message for the selected service provider, for example, using the user message screen 630 as depicted in FIG. 6. When the user has completed the voice message at step 776, the system 100 transmits the voice message to the selected service provider.

Application of the Invention

Danielle, a graduate student in economics, happens to be an expert user of Microsoft Excel. To earn extra money while writing her thesis, Danielle decides to post her Excel-help service son the subject web site, an Internet based implementation of the invention. She registers at the site and lists herself under "Computer Help" and "Excel" at the rate of $1.00 per minute. During the registration process, Danielle provides her telephone number and a description of her abilities, which include regression models and statistical analysis. Whenever Danielle is at home alone studying for long stretches in the evening, she signs on to the subject web site and changes her state of availability to "On Call," or immediately available to receive clients.

Michael is a management consultant building a regression model on Excel for a large clothing retailer. At midnight in the office, he is having trouble analyzing his spreadsheet. Looking to receive help, he dials the 1-800 number of the subject system. He is prompted by the system to indicate the area of service he desires. He speaks the words, "Computer Help," which are recognized by the system's voice-recognition software. The system has several thousand computer-help service providers to choose from, so Michael specifies his needs by speaking the words, "regression models and analysis." The system has about 50 service providers who are "On Call" to receive customers regarding regression models and analysis. Michael then indicates the price and quality he desires by speaking the words, "one dollar per minute or less" and "with a three-star quality rating or above." The system uses these parameters to fine only those service providers who fit within this price and quality range and can presently receive customers regarding regression models and analysis—there are four. The system relays the descriptions of the four service providers to Michael. He selects Danielle by speaking the words, "Connect Me."

Since Michael has not used the subject phone system before, he first must enter his credit card number to pay for the call. Once the credit card number has been confirmed, the system dials Danielle's phone number, which it has on file from her registration at the web site. When Danielle picks up the phone, the automated voice of the system informs her that there is a client on the line looking for "Computer Help" and willing to pay her $1.00 price per minute. The system asks her whether she would like to accept the call. She speaks the word "yes" (or presses "1" on her telephone keypad), and the system conferences the separate phone calls to Danielle and Michael together so that they can communicate.

However, for the reasons described above, the system cannot always establish a real-time communications connection between Michael and Danielle. Generally, the failure of the system to establish a connection between Michael and Danielle results from the unavailability of Danielle during an unindicated time of unavailability. If the system fails to establish a connection between Michael and Danielle, Michael will be presented with a user interface screen and prompted to leave a message for Danielle. Once Michael has left the message for Danielle, the voice mail message will be transmitted to Danielle. Once Danielle receives the message, Danielle is presented with the option of re-establishing a real-time communications connection with Michael via a service provider voice mail review screen. In response to such a request from Danielle, the system will connect Michael and Danielle so that they may proceed with the live conversation and resolve Michael's technical difficulty.

Michael and Danielle talk until his problem is solved, which takes eight minutes. Michael's credit card is billed for eight dollars. He receives a confirming message via electronic mail notifying him of this, along with a request to evaluate Danielle's service, which he does, pressing "5" on his telephone keypad to award her five stars, which the system then averages into her overall quality rating. Danielle's web site account is credited for eight dollars minus a fee collected by the web site. Once Danielle's web site account has accumulated a surplus of $25, she receives a check from the web site in the mail. After receiving many positive reviews from online clients such as Michael, Danielle is inundated with Excel-help requests whenever she goes "On Call," enabling her to raise her rates to $1.50 per minute.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known components and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

Although the present invention has been described with reference to a service provider system, it is not limited to providing services over the telephone or between computers. The present invention can be used for other electronic commerce purposes, other commodities, other types of provider, and other types of services not explicitly listed. In addition, communications mediums within the contemplation of the present invention include systems for wireless communications or any network capable of transmitting voice data or video data for providing a live conversation over the computer. Moreover, performance, by a human operator, of the interactive voice recognition procedures of the present invention is within the contemplation of the present invention.

Advantages of the invention include providing users with the capability to engage in a live conversation with a selected service provider via a telephone. Contrary to prior systems, requiring an internet connection and browser to receive such services, the equivalent is now provided by a simple voice transmission medium such as the telephone. As a result, virtually anyone can benefit from the capabilities provided by the present invention. The system also allows providers of a field of service to be compensated for supplying their expertise to a user. In addition, the system ensures a real-time communications connection between a service seeker and a selected service provider once the service provider becomes available following an initial unavailability.

Having disclosed exemplary embodiments and the best mode, modifications and variations may be made to the disclosed embodiments while remaining within the scope of the invention as defined by the following claims.

What is claimed is:

1. A method comprising:
   receiving a selection from a user for a selected service provider;
   initiating a first connection between the user and the selected service provider to establish a real-time communications link;
   in response to a failure to establish the first connection, recording a message from the user to the selected service provider;
   in response to the service provider reviewing the message, presenting an option to initiate a second connection with the user;
   initiating a second connection between the selected service provider and the user via the real-time communications link in response to the service provider selecting the option; and
   collecting a fee for establishing the real-time communications link, including billing the user for establishing the real-time communications link with the selected service provider, and compensating the selected service provider for the live real-time communications link with the user.

2. The method of claim 1, wherein information corresponding to the selected service provider is stored in a service provider database.

3. The method of claim 2, wherein the service provider database stores information corresponding to a plurality of service providers from a wide array of fields of service.

4. The method of claim 1, further comprising:
   receiving a request from a service provider of a field of service for inclusion in the service provider database; and
   when the service provider is approved for inclusion in the service provider database, generating a record in the service provider database, the record including provider information contained in the request.

5. The method of claim 4, wherein the provider information includes one or more of a service price, real-time service provider availability, specific expertise of the service provider, languages spoken by the service provider, voice message capability and a quality rating for the service provider.

6. The method of claim 1, wherein the billing the user further comprises:
   measuring a duration of the real-time communications link between the user and the selected service provider; and
   calculating a billing amount for the user based on the duration of the real-time communications link and a time-based price charged by the selected service provider.

7. The method of claim 1, wherein the fee is predetermined as a percentage of a billing amount.

8. The method of claim 1, further comprising:
   if the real-time communications link is not established due to selected service provider unavailability, deducting a predetermined amount from the selected service provider; and
   if the selected service provider is connected with the user following review of the message, refunding the predetermined amount deducted from the selected service provider.

9. The method of claim 1, wherein the connecting the user with the selected service provider further comprises:
   placing, by the service provider system, a telephone call to the user via a connection separate from an internet connection between the user and the service provider system;
   placing, by the service provider system, a telephone call to said service provider; and
   interfacing the telephone calls to the user and the selected service provider.

10. The method of claim 1, wherein prior to the receiving the selection, the method further comprises:
    receiving a request from a user for connection to a service provider system via the real-time communications link;
    establishing a connection between the user and the service provider system in order to provide the user with a live connection with a chosen service provider;
    providing the user with a list of the wide array of fields of service available from the service provider system;
    receiving a selected field of service from the user; and
    providing a list of service providers within the selected field of service, the list indicating individually whether each service provider is currently available to communicate with the user at a time when the user is viewing the list, the list further indicating individually whether a service provider is currently communicating with another user when the user is viewing the list, the list also including a compensation rate for each service provider.

11. The method of claim 1, wherein the recording the message further comprises:
    re-trying to connect the user with the selected service provider via the real-time communications link a predetermined number of times;
    prompting the user to record a voice message for the selected service provider; and
    once the user completes recording of the voice message, notifying the selected service provider of the voice message.

12. A computer readable storage medium including program instruction that directs a computer to perform a method when executed by a processor, the method comprising:

receiving a selection from a user for a selected service provider;

initiating a first connection between the user and the selected service provider to establish a real-time communications link;

in response to a failure to establish the first connection, recording a message from the user to the selected service provider;

in response to the service provider reviewing the message, presenting an option to initiate a second connection with the user;

initiating a second connection between the selected service provider and the user via the real-time communications link in response to the service provider selecting the option; and collecting a fee for a connection initiation for establishing the real-time communications link, including billing the user for establishing the real-time communications link with the selected service provider, and compensating the selected service provider for the live real-time communications link with the user.

13. The computer readable storage medium of claim 12, wherein information corresponding to the selected service provider is stored in a service provider database.

14. The computer readable storage medium of claim 13, wherein the service provider database stores information corresponding to a plurality of service providers from a wide array of fields of service.

15. The computer readable storage medium of claim 12, the method further comprising:

receiving a request from a service provider of a field of service for inclusion in the service provider database; and when the service provider is approved for inclusion in the service provider database, generating a record in the service provider database, the record including provider information contained in the request.

16. The computer readable storage medium of claim 15, wherein the provider information includes one or more of a service price, real-time service provider availability, specific expertise of the service provider, languages spoken by the service provider, voice message capability and a quality rating for the service provider.

17. The computer readable storage medium of claim 12, wherein the billing the user further comprises:

measuring a duration of the real-time communications link between the user and the selected service provider; and calculating a billing amount for the user based on the duration of the real-time communications link and a time-based price charged by the selected service provider.

18. The computer readable storage medium of claim 12, wherein the fee is predetermined as a percentage of a billing amount.

19. The computer readable storage medium of claim 12, the method further comprising:

if the real-time communications link is not established due to selected service provider unavailability, deducting a predetermined amount from the selected service provider; and if the selected service provider is connected with the user following review of the message, refunding the predetermined amount deducted from the selected service provider.

20. The computer readable storage medium of claim 12, wherein the connecting the user with the selected service provider further comprises:

placing, by the service provider system, a telephone call to the user via a connection separate from an internet connection between the user and the service provider system;

placing, by the service provider system, a telephone call to said service provider; and interfacing the telephone calls to the user and the selected service provider.

21. The computer readable storage medium of claim 12, wherein prior to the receiving the selection, the method further comprises:

receiving a request from a user for connection to a service provider system via the real-time communications link;

establishing a connection between the user and the service provider system in order to provide the user with a live connection with a chosen service provider;

providing the user with a list of the wide array of fields of service available from the service provider system;

receiving a selected field of service from the user; and providing a list of service providers within the selected field of service, the list indicating individually whether each service provider is currently available to communicate with the user at a time when the user is viewing the list, the list further indicating individually whether a service provider is currently communicating with another user when the user is viewing the list, the list also including a compensation rate for each service provider.

22. The computer readable storage medium of claim 12, wherein the recording the message further comprises:

re-trying to connect the user with the selected service provider via the real-time communications link a predetermined number of times;

prompting the user to record a voice message for the selected service provider; and once the user completes recording of the voice message, notifying the selected service provider of the voice message.

23. A system comprising:

a user interface to receive a request from a user for a service provider;

a processor to receive, from the user interface, a selection from the user for a selected provider and initiate a connection between the user and the selected service provider to establish a real-time communications link, the processor enabling the user to leave a voice message for the selected service provider in response to a failure to establish the connection, the processor, in response to the service provider reviewing the message, to present an option to initiate a second connection with the user;

the processor, in response to the service provider selecting the option, to initiate a second connection between the selected service provider with the user via the real-time communications link; and the processor to collect a fee for establishing the real-time communications link, bill the user for establishing the real-time communications link with the selected service provider, and compensate the selected service provider for the live real-time communications link with the user.

24. The system of claim 23, wherein the user request is a voice request.

25. The system of claim 23, wherein information corresponding to the service provider is stored in a service provider database.

26. The system of claim 23, wherein the user interface provides the user with a list of fields of service providers available, accepts a field of service desired by the user, provides the user with a list of one or more service providers stored in a service provider database which match the field of service desired by the user, and a receives a selection from the user for a selected provider.

27. The system of claim 23, further including a provider interface for receiving a request from a service provider of a field of service for inclusion in the service provider database, and generating a record in the service provider database, the record including provider information contained in the request.

28. The system of claim 27, wherein the provider information includes one or more of a service price, real-time service provider availability, specific expertise of the service provider, languages spoken by the service provider, voice-mail capability and a quality rating for the service provider.

29. The system of claim 23, wherein the real-time communications link further includes a public switched telephone network interface to connect the user to the selected service provider.

30. The system of claim 23, wherein the real-time communications link further includes a wireless communications network interface to connect the user to the selected service provider.

31. The system of claim 23, wherein the real-time communications link further includes a video communications link to connect the user to the selected service provider.

32. The system of claim 23, wherein the fee is predetermined as a percentage of a billing amount.

33. The system of claim 23, wherein the fee is about ten percent of a billing amount.

34. A method comprising:
receiving a selection from a user for a selected service provider;
initiating a first connection between the user and the selected service provider to establish a real-time communications link;
if the real-time communications link is not established due to selected service provider unavailability, deducting a predetermined amount from the selected service provider
in further response to a failure to establish the first connection, recording a message from the user to the selected service provider;
in response to the service provider reviewing the message, presenting an option to initiate a second connection with the user;
initiating the second connection between the selected service provider and the user via the real-time communications link in response to the service provider selecting the option;
if the selected service provider is connected with the user following review of the message, refunding the predetermined amount deducted from the selected service provider; and
collecting a fee for establishing the real-time communications link.

35. A method comprising:
receiving a request from a user for connection to a service provider system;
establishing a connection between the user and the service provider system;
providing the user with a list of fields of services available from the service provider system;
receiving a selected field of service from the user;
providing a list of service providers within the selected field of service, the list indicating individually whether each service provider is currently available to communicate with the user at a time when the user is viewing the list, the list further indicating individually whether a service provider is currently communicating with another user when the user is viewing the list, the list also including a compensation rate for each service provider;
receiving a selection from a user for a selected service provider;
initiating a first connection between the user and the selected service provider to establish a real-time communications link;
in response to a failure to establish the first connection, recording a message from the user to the selected service provider;
in response to the service provider reviewing the message, presenting an option to initiate a second connection with the user;
initiating the second connection between the selected service provider and the user via the real-time communications link in response to the service provider selecting the option; and
collecting a fee for establishing the real-time communications link.

36. A computer readable storage medium including program instruction that directs a computer to perform a method when executed by a processor, the method comprising:
receiving a selection from a user for a selected service provider;
initiating a first connection between the user and the selected service provider to establish a real-time communications link;
if the real-time communications link is not established due to selected service provider unavailability, deducting a predetermined amount from the selected service provider
in further response to a failure to establish the first connection, recording a message from the user to the selected service provider;
in response to the service provider reviewing the message, presenting an option to initiate a second connection with the user;
initiating the second connection between the selected service provider and the user via the real-time communications link in response to the service provider selecting the option;
if the selected service provider is connected with the user following review of the message, refunding the predetermined amount deducted from the selected service provider; and
collecting a fee for establishing the real-time communications link.

37. A computer readable storage medium including program instruction that directs a computer to perform a method when executed by a processor, the method comprising:
receiving a request from a user for connection to a service provider system;

establishing a connection between the user and the service provider system;

providing the user with a list of fields of services available from the service provider system;

receiving a selected field of service from the user;

providing a list of service providers within the selected field of service, the list indicating individually whether each service provider is currently available to communicate with the user at a time when the user is viewing the list, the list further indicating individually whether a service provider is currently communicating with another user when the user is viewing the list, the list also including a compensation rate for each service provider;

receiving a selection from the user for a selected service provider;

initiating a first connection between the user and the selected service provider to establish a real-time communications link;

in response to a failure to establish the first connection, recording a message from the user to the selected service provider;

in response to the service provider reviewing the message, presenting an option to initiate a second connection with the user;

initiating the second connection between the selected service provider and the user via the real-time communications link in response to the service provider selecting the option; and collecting a fee for establishing the real-time communications link.

38. A system comprising:

a processor to receive, from a user interface, a selection from a user for a selected provider and to initiate a connection between the user and the selected service provider to establish a real-time communications link, the processor to enable a user to leave a voice message for the selected service provider in response to a failure to establish the connection, and the processor to deduct a predetermined amount from the selected service provider if the real-time communications link is not established due to selected service provider unavailability;

the processor, in response to the service provider reviewing the message, to present an option to initiate a second connection with the user;

the processor, in response to the service provider selecting the option, to initiate the second connection between the selected service provider with the user via the real-time communications link, and refund the predetermined amount deducted from the selected service provider if the selected service provider is connected with the user following review of the message; and a unit to collect a fee for establishing the real-time communications link.

39. A system comprising:

a unit to receive a request from a user for connection to a service provider system;

a unit to establish a connection between the user and the service provider system to provide the user with a list of fields of services available from the service provider system;

a unit to receive a selected field of service from the user;

a unit to provide a list of service providers within the selected field of service, the list to indicate individually whether each service provider is currently available to communicate with the user at a time when the user is viewing the list, the list to further indicate individually whether a service provider is currently communicating with another user when the user is viewing the list, the list also to include a compensation rate for each service provider;

a unit to receive a selection from a user for a selected service provider;

a unit to initiate a first connection between the user and the selected service provider to establish a real-time communications link, and record a message from the user to the selected service provider, in response to a failure to establish the first connection;

a unit to present an option to initiate a second connection with the user, in response to the service provider reviewing the message, and to initiate the second connection between the selected service provider and the user via the real-time communications link in response to the service provider selecting the option; and a unit to collect a fee for establishing the real-time communications link.

* * * * *